(12) United States Patent
Howell-McLean et al.

(10) Patent No.: US 10,960,955 B2
(45) Date of Patent: Mar. 30, 2021

(54) BICYCLE ELECTRICAL CONTROL DEVICE AND SYSTEM

(71) Applicant: SRAM, LLC, Chicago, IL (US)

(72) Inventors: Tyler Howell-McLean, Evanston, IL (US); Sang Kim, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 15/843,721

(22) Filed: Dec. 15, 2017

(65) Prior Publication Data
US 2019/0185109 A1    Jun. 20, 2019

(51) Int. Cl.
| B62M 25/08 | (2006.01) |
| G08C 17/02 | (2006.01) |
| B62K 23/02 | (2006.01) |
| B62L 3/02 | (2006.01) |
| B62K 23/00 | (2006.01) |

(52) U.S. Cl.
CPC ............. *B62M 25/08* (2013.01); *B62K 23/02* (2013.01); *G08C 17/02* (2013.01); *B62K 23/00* (2013.01); *B62L 3/02* (2013.01)

(58) Field of Classification Search
CPC . B62M 25/08; B62M 2025/003; G08C 17/02; B62K 23/00; B62L 3/02
See application file for complete search history.

(56) References Cited

U.S. PATENT DOCUMENTS

| 4,489,307 A | 12/1984 | Nagano |
| 5,308,419 A | 5/1994 | Sakuri |
| 5,721,539 A * | 2/1998 | Goetzl ................ A63C 17/26 235/95 R |
| 7,667,958 B2 | 2/2010 | Ueda |
| 7,915,554 B2 | 3/2011 | Ueda et al. |
| 8,149,098 B2 | 4/2012 | Miglioranza |
| 8,949,022 B1 * | 2/2015 | Fahrner ................ G01C 21/20 701/433 |
| 8,988,862 B2 | 3/2015 | Yuen |
| 9,191,038 B2 | 11/2015 | Abe et al. |
| 9,229,712 B2 | 1/2016 | Takamoto et al. |
| 9,499,234 B2 | 11/2016 | Tetsuka |
| 9,592,882 B2 * | 3/2017 | Butora .................... B62J 1/06 |
| 9,960,641 B2 * | 5/2018 | Ichikawa ............... H01F 38/14 |

(Continued)

OTHER PUBLICATIONS

Cateye, "CC-PA50013, Padrone Smart", http://www.cateye.com/en/products/detail/CC-PA500B/, Dec. 14, 2017, (2 pages).

(Continued)

*Primary Examiner* — Thomas D Alunkal

(57) ABSTRACT

An electrical control device for a bicycle includes a housing and an assembly supported within the housing. The assembly includes a printed circuit board (PCB). The PCB includes a substrate and circuitry embedded within, attached to, or embedded within and attached to the substrate. The electrical control device also includes a communication device electrically connected to the circuitry and supported by the substrate. The communication device includes an antenna. The electrical control device includes a power source supported within the housing. The power source is electrically connected to the circuitry. The substrate is disposed between the power source and the antenna.

20 Claims, 24 Drawing Sheets

(56) References Cited

U.S. PATENT DOCUMENTS

| | | | | |
|---|---|---|---|---|
| 2008/0174494 | A1* | 7/2008 | Suzuki | H01Q 1/243 |
| | | | | 343/700 MS |
| 2017/0003149 | A1* | 1/2017 | Berk | G01D 11/26 |
| 2018/0019513 | A1* | 1/2018 | Farkas | H01Q 1/2225 |
| 2018/0035481 | A1* | 2/2018 | Panther | A61B 5/681 |
| 2018/0099718 | A1* | 4/2018 | Bleecker | B60K 35/00 |
| 2018/0304952 | A1* | 10/2018 | Krugman | B62J 99/00 |

OTHER PUBLICATIONS

Garmin, "Edge Explore 820", https://buy.garmin.com/en-US/US/p/561299, Dec. 14, 2017, (4 pages).

Garmin, "Foot Pod", https://buy.garmin.com/en-US/US/p/15516, Dec. 14, 2017, (1 page).

Shimano, "SM-EW90-B Di2 Junction B Box—E-Tube, 5 Port", http://www.wiggle.com/shimano-sm-ew90-b-di2-junction-b-box-e-tube-5-port/, Dec. 14, 2017, (2 pages).

* cited by examiner

BICYCLE ELECTRICAL CONTROL DEVICE AND SYSTEM

BACKGROUND

Traditional hand actuated control devices such as shifters and/or brake levers for bicycles and other handlebar-steerable vehicles may include levers and/or other mechanisms attached to handlebars. These mechanisms are configured to control various types of mechanical or electromechanical bicycle components, such as drive system components, braking components, and/or suspension components. Traditional levers or other devices may be specifically designed for particularly configured handlebar orientations and/or particular placement within a handlebar orientation. Further, the traditional mechanisms may include bulky parts or assemblies that are not easily placed in alternate positions throughout handlebar orientations, or in other locations of the bicycle.

SUMMARY

In one example, an electrical control device for a bicycle is provided. The electrical control device includes a housing and an assembly supported within the housing. The assembly includes a printed circuit board (PCB). The PCB includes a substrate and circuitry embedded within, attached to, or embedded within and attached to the substrate. The electrical control device also includes a communication device electrically connected to the circuitry and supported by the substrate. The communication device includes an antenna. The electrical control device includes a power source supported within the housing. The power source is electrically connected to the circuitry. The substrate is disposed between the power source and the antenna.

In one example, the communication device includes two antennas. The power source is in electrical communication with a first surface of the opposite surfaces of the substrate. A first antenna of the two antennas is supported by a second surface of the opposite surfaces of the substrate at a first position, and a second antenna of the two antennas is supported by the second surface of the substrate at a second position. The first position and the second position are adjacent to a perimeter of the second surface of the substrate, respectively, and are at a distance from each other. The power source is configured to provide power to the first antenna and the second antenna.

In one example, the perimeter of the second surface has at least a first edge and a second edge opposite and at a distance from the first edge. The first antenna is adjacent to the first edge, and the second antenna is adjacent to the second edge.

In one example, the power source includes a removable battery.

In one example, the electrical control device further includes a battery cover that is removably connectable to the battery housing. The removable battery is disposable between the battery cover and a portion of the battery housing, within a recess at least partially defined by the portion of the housing.

In one example, the electrical control device further includes a rigid support that extends away from the portion of the housing. The substrate abuts the rigid support.

In one example, the electrical control device further includes a plurality of connectors supported by a surface of the substrate. The plurality of connectors abut or are adjacent to the rigid support.

In one example, the power source is disposed at a distance from the substrate.

In one example, the electrical control device further includes a plurality of connectors supported by the substrate. The plurality of connectors are in line with each other. The plurality of connectors are disposed between the substrate and the power source.

In one example, the housing includes a blind hole extending from an outer surface of the housing, into the housing. The electrical control device further includes a threaded insert positioned within the blind hole. The threaded insert has a through hole extending between a first side of the threaded insert and a second side of the threaded insert. A size of the through hole is larger at the first side of the threaded insert compared to the second side of the threaded insert. Less than all of the through hole is threaded.

In one example, the housing includes a bicycle attachment device configured for attachment to the bicycle.

In one example, an electrical control device for a bicycle includes a housing, a substrate supported within the housing, and at least two antennas electrically connected to and supported by the substrate. A first antenna of the at least two antennas is supported by the substrate at a first position on the substrate, and a second antenna of the at least two antennas is supported by the substrate at a second position on the substrate. The second position is different than the first position.

In one example, the substrate is a unitary substrate.

In one example, the housing includes a bicycle attachment device configured for attachment to the bicycle.

In one example, the first antenna is configured to communicate with one or more components of the bicycle operable to change a physical state of the bicycle.

In one example, the first antenna has a higher efficiency than the second antenna.

In one example, the at least two antennas are electrically connected to and supported by a same surface of the substrate.

In one example, the first position is adjacent to a first edge partially defining a perimeter of the same surface of the substrate, and the second position is adjacent to a second edge partially defining the perimeter of the same surface of the substrate.

In one example, the electrical control device further includes a power source supported within the housing, at a distance from the substrate. The at least two antennas and the power source are electrically connected to opposite surface of the substrate, respectively.

In one example, the housing has an inner surface. The electrical control device further includes a layer of electrically conductive material. The layer of electrically conductive material is physically connected to the inner surface of the housing. At least one antenna of the at least two antennas is electrically connected to the layer of electrically conductive material.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The present disclosure provides examples of bicycle electrical control devices that solve or improve upon one or more of the above-noted and/or other disadvantages with prior known mechanical and electrical control devices. The disclosed bicycle electrical control devices remove the power supply (e.g., battery) from the printed circuit board (PCB) supported within the electrical control device. The battery, for example, is stacked above the PCB and connectors, via which the electrical control device communicates with components on the bicycle. The stacking of the PCB, the connectors, and the battery, for example, reduces an overall package size of the electrical control device. An overmolded button integrated with the housing of the electrical control device also reduces the size of the electrical control device compared to an electrical control device that uses a combination of a separate hard button and seals.

The PCB supports antennas configured to communicate with an internal network (e.g., a network of the bicycle) and/or an external network. The stacking of the battery, for example, above the PCB and, more specifically, the distance between the PCB and the battery due to the stacking improves antenna performance compared to an electrical control device within which the battery is on the PCB.

Various embodiments of the invention will be described herein with reference to the drawings. It will be understood that the drawings and the description set out herein are provided for illustration only and do not limit the invention as defined by the claims appended hereto and any and all their equivalents. For example, the terms "first" and "second", "front" and "rear", and "left" and "right" are used for the sake of clarity and not as terms of limitation. Moreover, the terms referred to bicycle mechanisms conventionally mounted to a bicycle and with the bicycle orientated and used in a standard fashion unless otherwise indicated.

Figure 1:
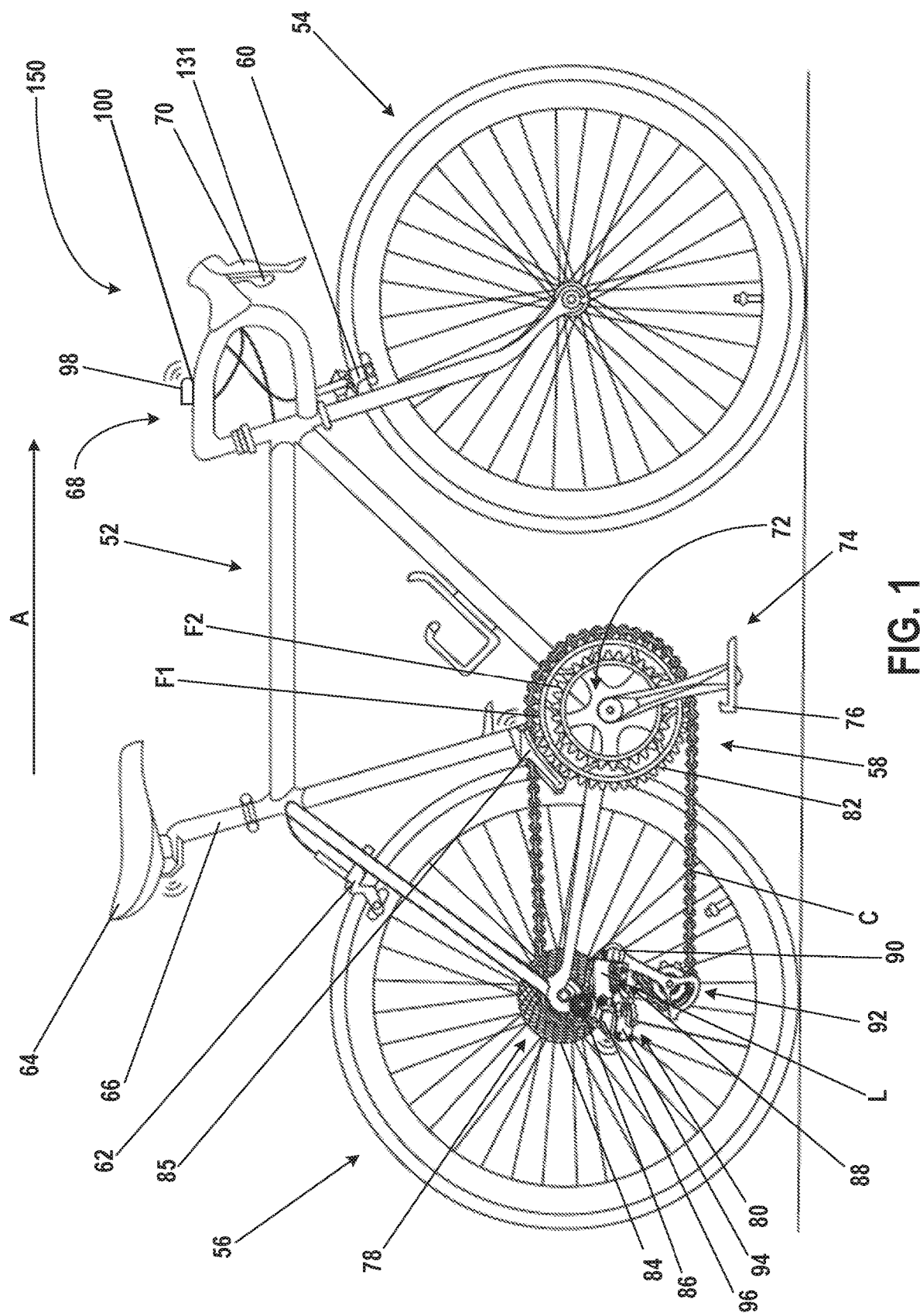
FIG. 1 is a side view schematic of a bicycle that may be constructed to utilize an electrical control device.

Turning now to the drawings, FIG. 1 generally illustrates a bicycle 50 that employs a control device in accordance with the teachings of the present disclosure. The bicycle 50 includes a frame 52, a front wheel 54 and a rear wheel 56 each rotatably attached to the frame 52, and a drivetrain 58. A front brake 60 is provided for braking the front wheel 54, and a rear brake 62 is provided for braking the rear wheel 56. The bicycle 50 also generally has a seat 64 near a rear end of the frame 52 and carried on an end of a seat tube 66 connected to the frame 52. The bicycle 50 also has handlebars 68 near a forward end of the frame 52. The handlebars 68 are attached to the frame 52 for user, or rider, control of the bicycle 50. A brake lever 70 is carried on the handlebars 68 for actuating one of the front brake 60 or rear brake 62, or both. If the brake lever 70 actuates only one of the front brake 60 and the rear brake 62, a second brake lever (not shown) may also be provided to actuate the other brake. A front and/or forward riding direction or orientation of the bicycle 50 is indicated by the direction of the arrow A in FIG. 1. As such, a forward direction for the bicycle 50 is indicated by the direction of arrow A.

While the illustrated bicycle 50 depicted in FIG. 1 is a road bike having drop-style handlebars 68, the present disclosure may be applicable to bicycles of any type, including mountain bikes with full or partial suspensions, as well as bicycles with mechanical (e.g., cable, hydraulic, and/or pneumatic) and non-mechanical (e.g., wired and/or wireless) drive systems.

The drivetrain 58 has a chain C and a front sprocket assembly 72, which is coaxially mounted with a crank assembly 74 having pedals 76. The drivetrain 58 also includes a rear sprocket assembly 78 coaxially mounted with the rear wheel 56 and a rear gear change mechanism, such as a rear derailleur 80.

As is illustrated in FIG. 1, the front sprocket assembly 72 may include one or more coaxially mounted chain rings, gears, or sprockets. In this example, the front sprocket assembly 72 has two such sprockets, F1 and F2, each having teeth 82 around a respective circumference. As shown in FIG. 1, the rear sprocket assembly 78 may include a plurality (e.g., eleven) of coaxially mounted gears, cogs, or sprockets. Each sprocket also has teeth 84 arranged around a respective circumference. The number of teeth 82 on the smaller diameter front sprocket F2 may be less than the number of teeth on the larger diameter sprocket F1. The numbers of teeth 84 on the rear sprockets may gradually decrease from the largest diameter rear sprocket to the smallest diameter sprocket. Though not described in any detail herein, a front gear changer 85 may be operated to move from a first operating position to a second operating position to move the chain C between the front sprockets F1 and F2. Likewise, the rear derailleur 80 may be operable to move between eleven different operating positions to switch the chain C to a selected one of the rear sprockets. In an embodiment, the rear sprocket assembly 72 may have more or fewer sprockets. For example, in an embodiment, a rear sprocket assembly may have twelve or thirteen sprockets. Dimensions and configuration of the rear derailleur 80 may be modified to accommodate a specific implemented plurality of sprockets. For example, an angle and length of the linkage and/or the configuration of the cage of the derailleur may be modified to accommodate specific sprocket combinations.

The rear derailleur 80 is depicted in these examples as a wireless, electrically actuated rear derailleur mounted or mountable to the frame 52, or frame attachment, of the bicycle 50. The electric rear derailleur 80 has a base member 86 (e.g., a b-knuckle) that is mounted to the bicycle frame 52. A linkage 88 has two links L that are pivotally connected to the base member 86 at a base member linkage connection portion. A movable member 90 (e.g., a p-knuckle) is connected to the linkage 88. A chain guide assembly 92 (e.g., a cage) is configured to engage and maintain tension in the chain and is pivotally connected to a part of the movable member 90. The cage 92 may rotate or pivot about a cage rotation axis in a damping direction and a chain tensioning direction.

A motor module 94 is carried on the electric rear derailleur 80 and has a battery 96. The battery 96 supplies power to the motor module 94. In one example, the motor module 94 is located in the movable member 90. However, the motor module 94 may instead be located elsewhere, such as in one of the links L of the linkage 88 or in the base member 86. The motor module 94 may include a gear mechanism or transmission. As is known in the art, the motor module 94 and gear mechanism may be coupled with the linkage 88 to laterally move the cage 92 and thus switch the chain C among the rear sprockets on the rear sprocket assembly 78.

The battery 96 may instead be an alternate power supply or power source and may operate other electric components of the bicycle 50 within a linked system. Further, multiple power supplies may be provided, which may collectively or individually power the electric components of the system, including the rear derailleur 80, such as a drive motor for an embodiment involving an electrically powered bicycle. Additional batteries or other power supplies may be attached to the derailleur or located at other positions, such as the frame 52. In this example, however, the battery 96 is configured to be attached directly to the rear derailleur 80, and to provide power to the components of the rear derailleur 80. In an embodiment, the rear derailleur is configured such that the battery 96 provides power to only the components of the rear derailleur 80.

As shown in the example of FIG. 1, a control device 98 is mounted to the handlebars 68 for wirelessly actuating the motor module 94 and operating the rear derailleur 80 for executing gear changes and gear selection. The control device 98 is mounted to the handlebars 68 with a control device coupler 100. Multiple control devices 98 may be used with the bicycle 50. The control device 98 is configured to actuate or otherwise control components of the bicycle 50. For example, the control device 98 may be configured to control gear shifting of the front gear changer 85 and/or the rear derailleur 80. The control device 98 may also be configured to control characteristics of other bicycle components, such as a seatpost or a suspension system (not shown).

In other embodiments, the control device 98 may be located in other locations on the bicycle 50. The control device 98 may also be located other than on the bicycle 50, such as, for example, on a rider's wrist or in a jersey pocket. The communication link may include wires, may be wireless, or may be a combination thereof. The control device 98 may include a processor, communication device (e.g. a wireless communication device), a memory, and one or more communication interfaces.

The handlebars 68 of FIG. 1 illustrates a drop bar configuration; however, the control device 98 may be used with other types of handlebar assemblies as well, such as aerobars, bullhorn bars, riser bars, or any other type of bicycle handlebar. Also, while the embodiments described herein describe control devices attached to handlebars, a person having experience in the art would recognize the possible positioning of control devices 98 at other areas of the bicycle 50, such as locations throughout the frame 52.

Figure 2:
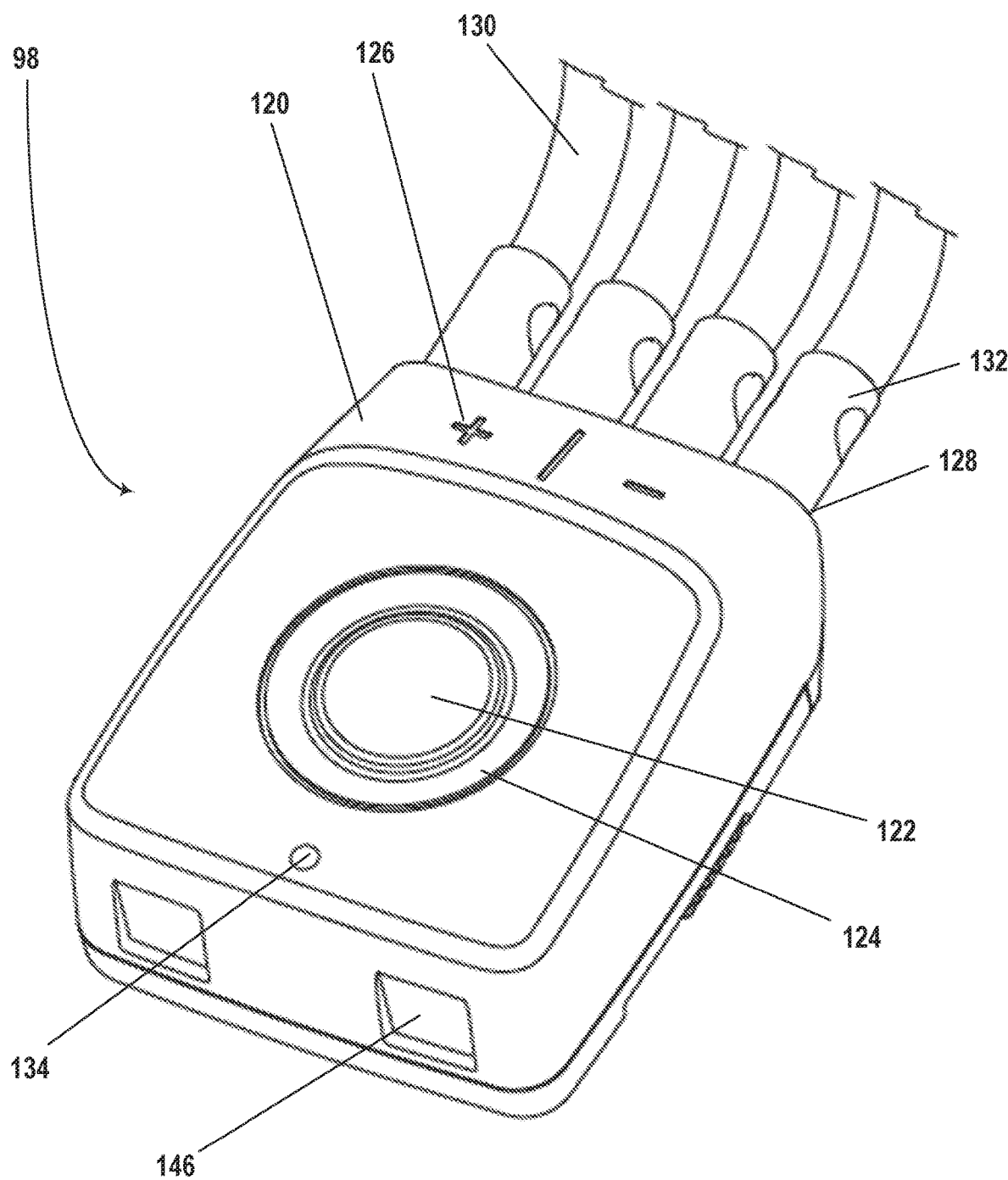
FIG. 2 is a first perspective view of an example of an electrical control device.
Figure 3:
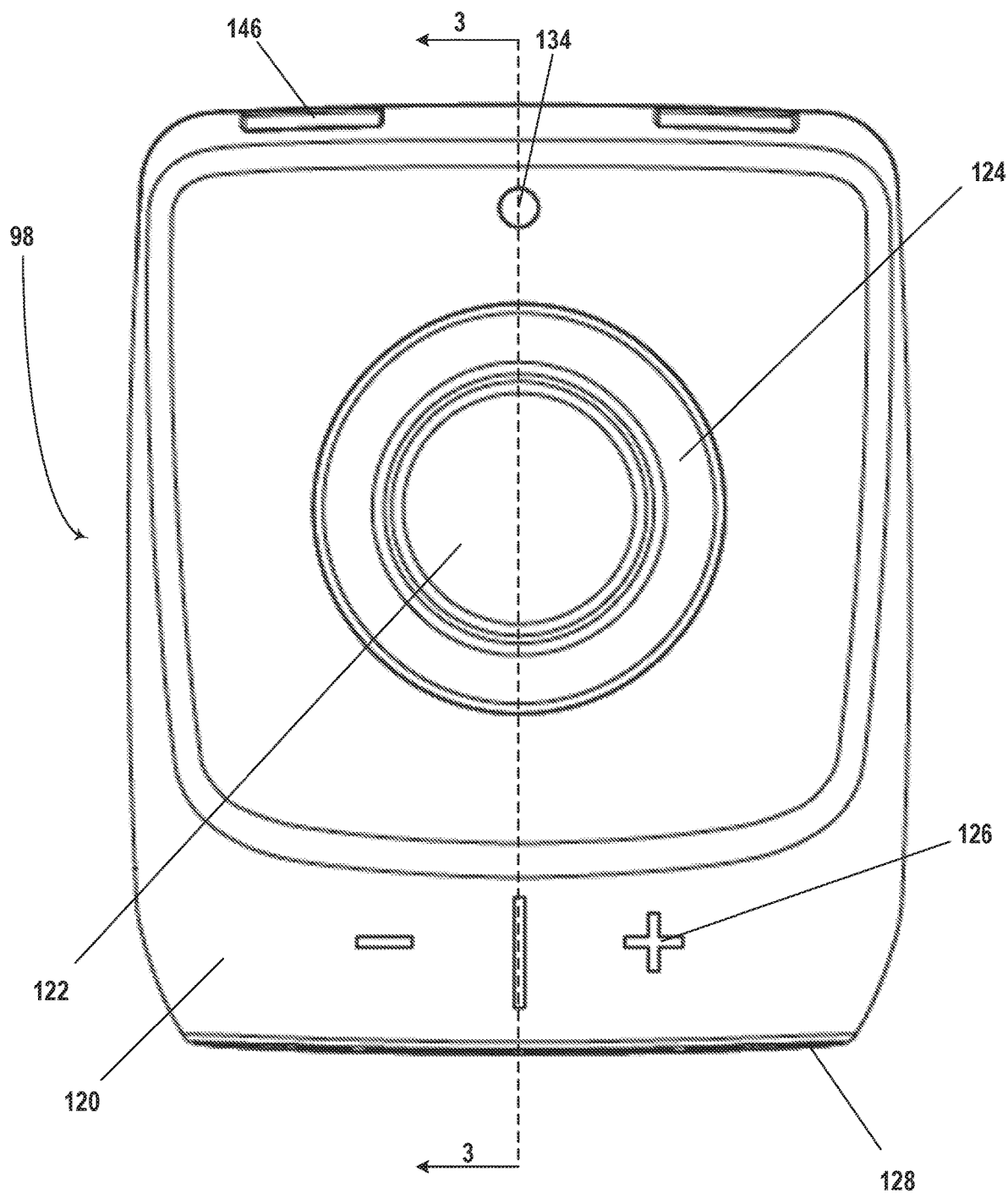
FIG. 3 is a top view of an example of an electrical control device.
Figure 4:
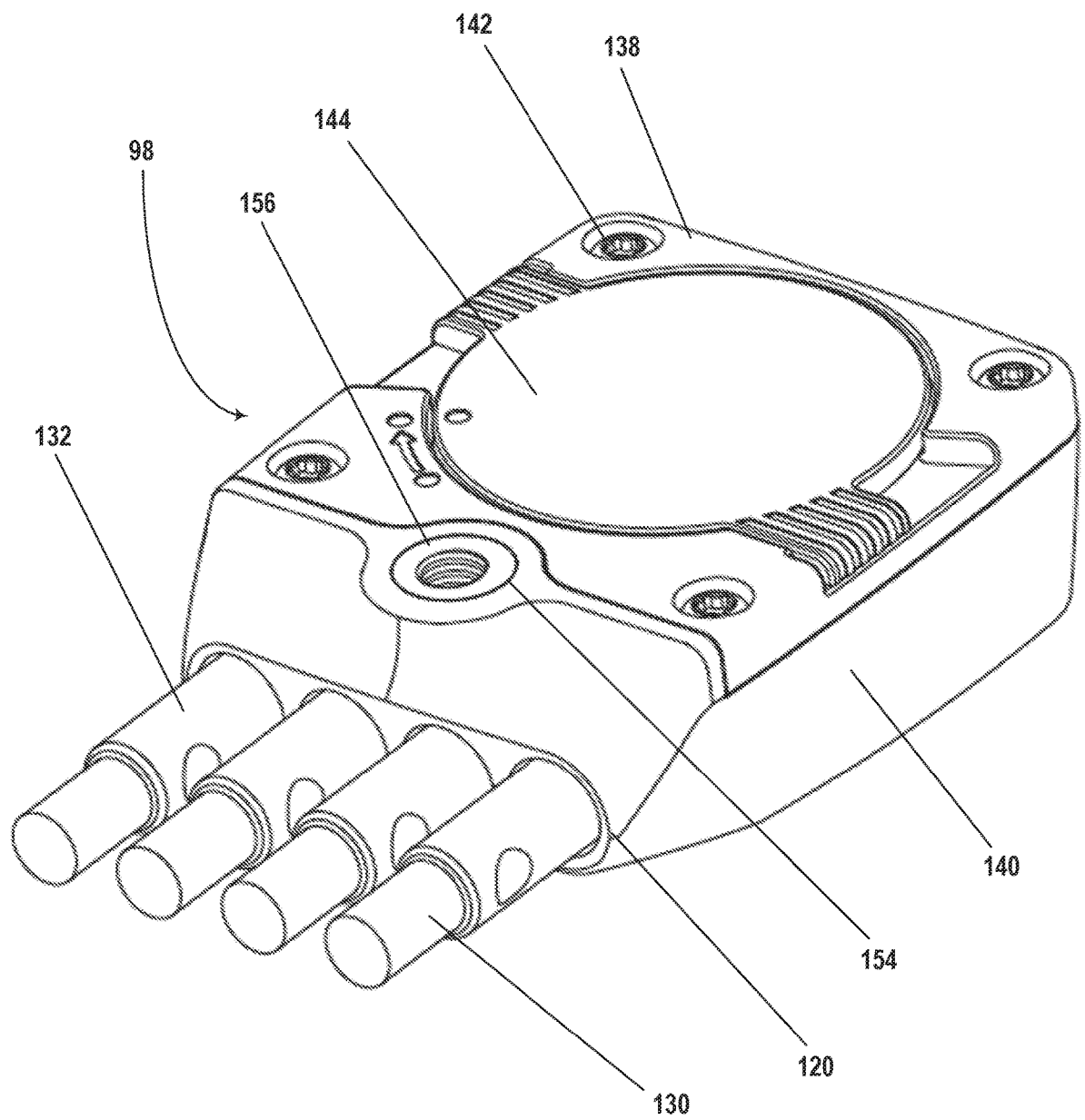
FIG. 4 is a second perspective view of an example of an electrical control device.

Referring to FIGS. 2-4, the control device 98 includes a protective housing 120 or other structure that protects components within the control device 98. The protective housing 120 may be any number of shapes and/or sizes. For example, the protective housing 120 may be rectangular shaped with rounded corners.

In one embodiment, a location of the actuation may be below a plane defined by a top surface of the control device 98 that includes an actuation surface 122. The actuation surface 122 may, for example, be a surface of an actuation button 124 supported by the protective housing 120. The actuation button 124, when pressed by a user, for example, activates the control mechanism supported within the protective housing 120. In one embodiment, the control mechanism, when activated by the actuation button 124, initiates pairing of the control device 98 with the rear derailleur 80 and/or micro adjustments for the rear derailleur 80.

In one embodiment, the protective housing 120 includes indicators 126 identifying which bicycle components should be connected where at the control device 98. For example, as shown in FIGS. 2 and 3, the "+" indicator 126 identifies ports 128 of the control device 98 into which components for an action associated with the "+" indicator 126 should be plugged. For example, components on the right side of the bicycle 50, for example, may be plugged into these ports for actions such as shifting the chain to a larger rear sprocket of the drivetrain. Further, the "−" indicator 126 identifies ports 128 of the control device 98 into which other components may be plugged, such as components on the left side of the bicycle 50. In one embodiment, the indicators 126 may be activatable to, for example, wirelessly shift the rear derailleur 80 inward and outward, respectively.

As shown in FIGS. 2 and 3, the control device 98 includes four ports 128; one or more components may be connected to the two "+" ports 128, and one or more components may be connected to the two "−" ports 128. In other embodiments, the control device 98 includes more or fewer ports 128, more or fewer "+" ports 128, and/or more or fewer "−" ports 128. Each grouping of ports 128, the "+" ports 128 and the "−" ports 128, may be grouped logically in, for example, firmware.

Shifters may be mounted in any number of locations on the bicycle 50. For example, the shifters may be shift levers 131 (see FIG. 1) located behind the brake levers 70. In another example, two shift buttons are mounted on the left side of the handlebars 68, and two shift buttons are mounted on the right side of the handlebars 68. The shifters are in communication (e.g., wired or wireless communication) with the control device 98. For example, the shift buttons on the left side of the handlebars 68 are in communication with the "−" ports 128 of the control device 98, and the shift buttons on the right side of the handlebars 68 are in communication with the "+" ports 128 of the control device 98. Each of the shift buttons is in communication with the ports 128 of the control device 98 with, for example, a cable 130 (only portions of which are shown in FIG. 4) and a connector 132. More or fewer shift buttons may be provided on the bicycle 50, for example, and/or the shift buttons may be provided at different locations on the bicycle 50 (e.g., on the frame 52 of the bicycle 50).

The shifters mounted to the bicycle 50 are activatable by a user of the bicycle 50, for example, to shift the rear derailleur 80 when coupled with the control device 98. For example, any of the shift buttons on the left side of the bicycle 50, corresponding to the "−" ports 128 of the control device 98, is activatable by the user of the bicycle 50 to shift the rear derailleur 80 inwards towards the bicycle 50; any of the shift buttons on the right side of the bicycle 50, corresponding to the "+" ports 128 of the control device 98, is activatable by the user of the bicycle 50 to shift the rear derailleur 80 outwards away from the bicycle 50. In other embodiments, the shift buttons perform different functions. For example, the shift buttons on the left side of the bicycle 50 may be activatable by the user of the bicycle 50 to shift the front gear changer 85, for example, inwards towards the bicycle 50, and the shift buttons on the right side of the bicycle 50 may be activatable by the user of the bicycle 50 to shift the front gear changer 85 outwards away from the bicycle 50.

Referring to FIGS. 2 and 3, the control device 98 also includes a light 134 (e.g., an LED light tube) in optical communication with an LED supported within the protective housing 120. The LED may be powered by a power supply supported within the protective housing 120 or another power supply. The LED is activated in response to different states of the control device 98. For example, the LED may be activated and emits a light (e.g., a red light) whenever a shift is performed via one of the shift buttons on the bicycle 50. As another example, the LED is activated based on a charge level of a power source for the control device 98. For example, the LED emits a green light (e.g., continuously) when the charge level of the power source is above a first predetermined level (e.g., percentage charge), the LED emits a yellow light (e.g., continuously) when the charge level is above a second predetermined level (e.g., percentage charge) and below the first predetermined level, and the LED emits a red light (e.g., continuously) when the charge level of the power source is below the second predetermined level. For example, the LED may emit a red light when the power source has less than two months of charge remaining. The LED may emit light for additional, fewer, and/or different states of the control device 98. The LED may emit different color light.

In one embodiment, the power supply supported within the protective housing 120 is a removable battery. Other power supplies may be provided to power the control device 98. Referring to FIG. 4, the protective housing 120 may include a battery housing 138. The battery housing 138 may be attached to a remaining portion 140 of the protective housing 120 in any number of ways including, for example, with one or more fasteners 142. For example, the battery housing 138 is attached to the remaining portion 140 of the protective housing 120 with four screws 142 secured within corresponding tapped holes within the remaining portion 140 of the protective housing 120. Additional, fewer, and/or other fasteners may be used to attach the battery housing 138 to the remaining portion 140 of the protective housing 120.

A battery cover 144 is attached to the battery housing 138. The battery cover 144 may be any number of shapes and/or sizes. For example, the battery cover 144 is circular shaped and is rotatably attached to the battery housing 138. The battery cover 144 may be finger operable to lock and unlock a translational position of the battery cover 144 relative to the battery housing 138. For example, the battery cover 144 may be secured in a twisting motion with force applied by an operator without the use of an additional tool.

Referring to FIGS. 2 and 3, the protective housing 120 includes securing features that facilitate attachment of the control device 98 to a bicycle (e.g., the bicycle 50). For example, the securing features may include receiving portions 146 on the protective housing 120. The receiving portions 146 are contoured to matingly engage, for example, an accessory mounting bracket. Also, or alternatively, the protective housing 120 of the control device 98 may be configured to integrate with the mounting bracket. As such, both control mechanism protection and bicycle integration may be achieved using features and characteristics of the protective housing 120.

Referring to FIGS. 5-9, one example of a mounting bracket 150 is attached to the protective housing 120 of the control device 98. For example, the mounting bracket 150 is attached to the battery housing 138 and/or the portion 140 of the protective housing 120. The mounting bracket 150 may be attached to the portion 140 of the protective housing 120, for example, in order to at least partially cover the battery housing 138 when the control device 98 and the mounting bracket 150 are mounted to the bicycle 50, for example. The covering of the battery housing 138 may help block debris and/or prevent unwanted removal of the power supply supported within the protective housing 120.

Figure 5:
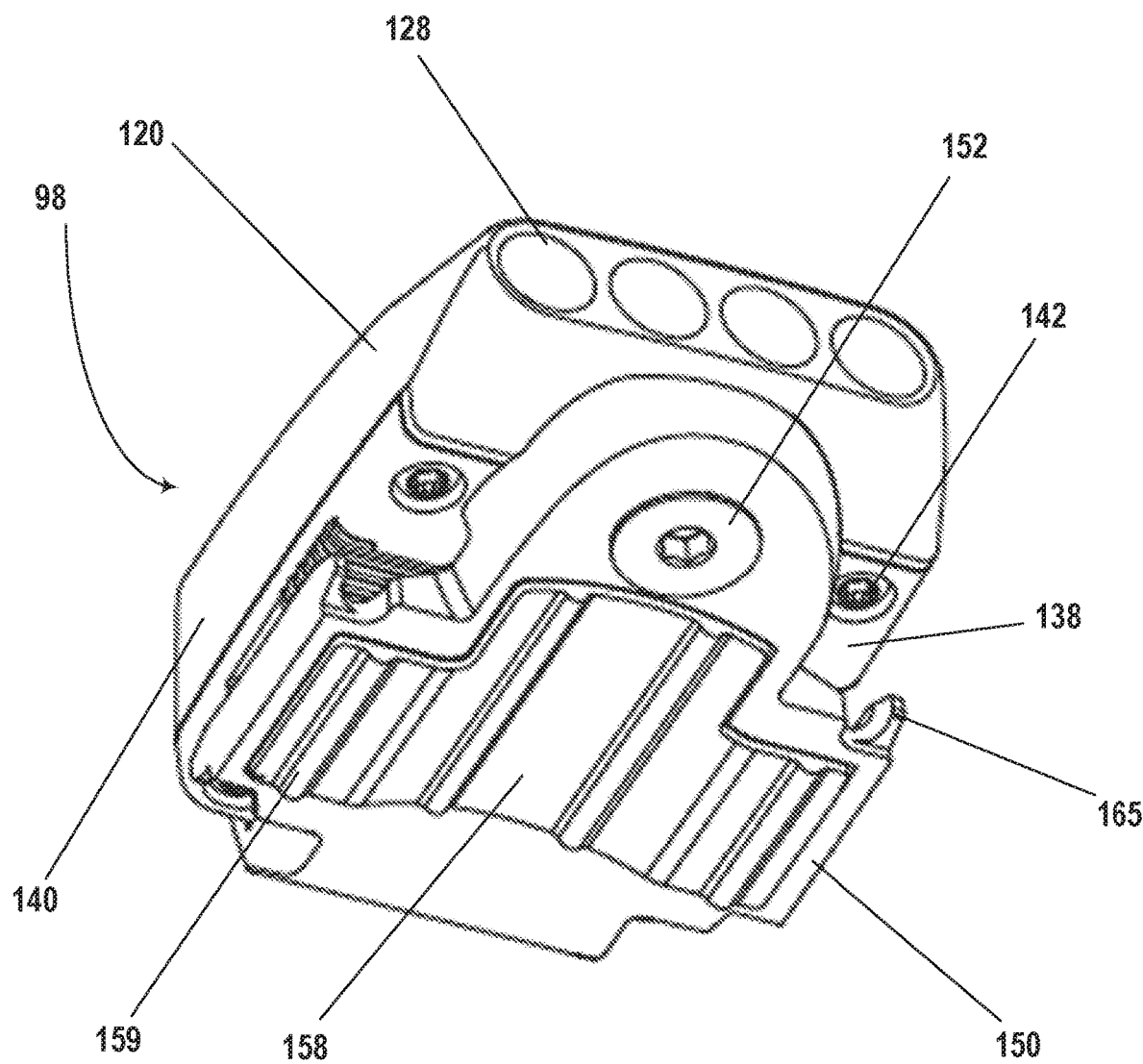
FIG. 5 is a first perspective view of an example of an electrical control device attached to a mounting bracket.
Figure 6:
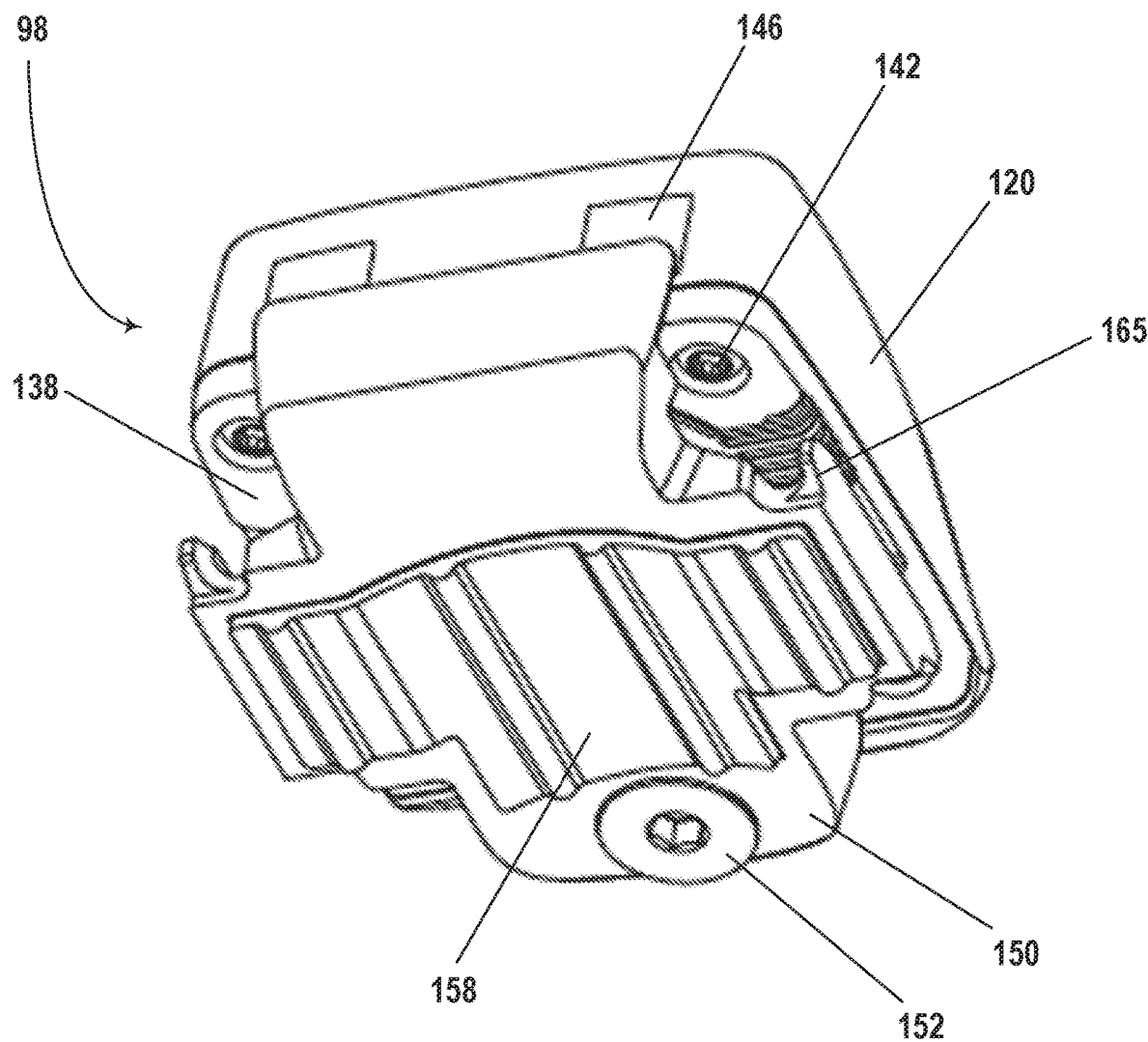
FIG. 6 is a second perspective view of an example of an electrical control device attached to a mounting bracket.
Figure 7:
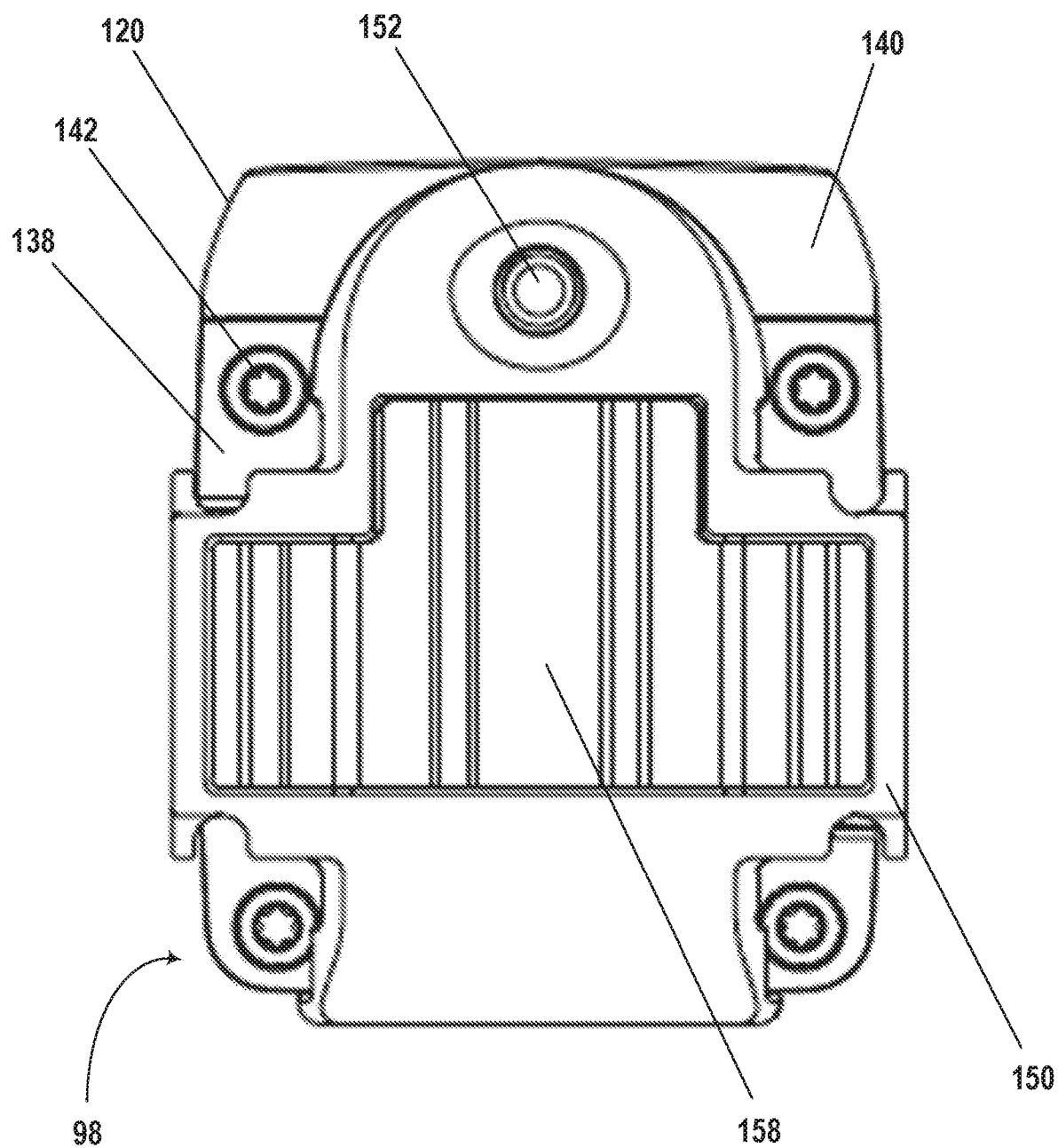
FIG. 7 is a bottom view of an example of an electrical control device attached to a mounting bracket.
Figure 8:
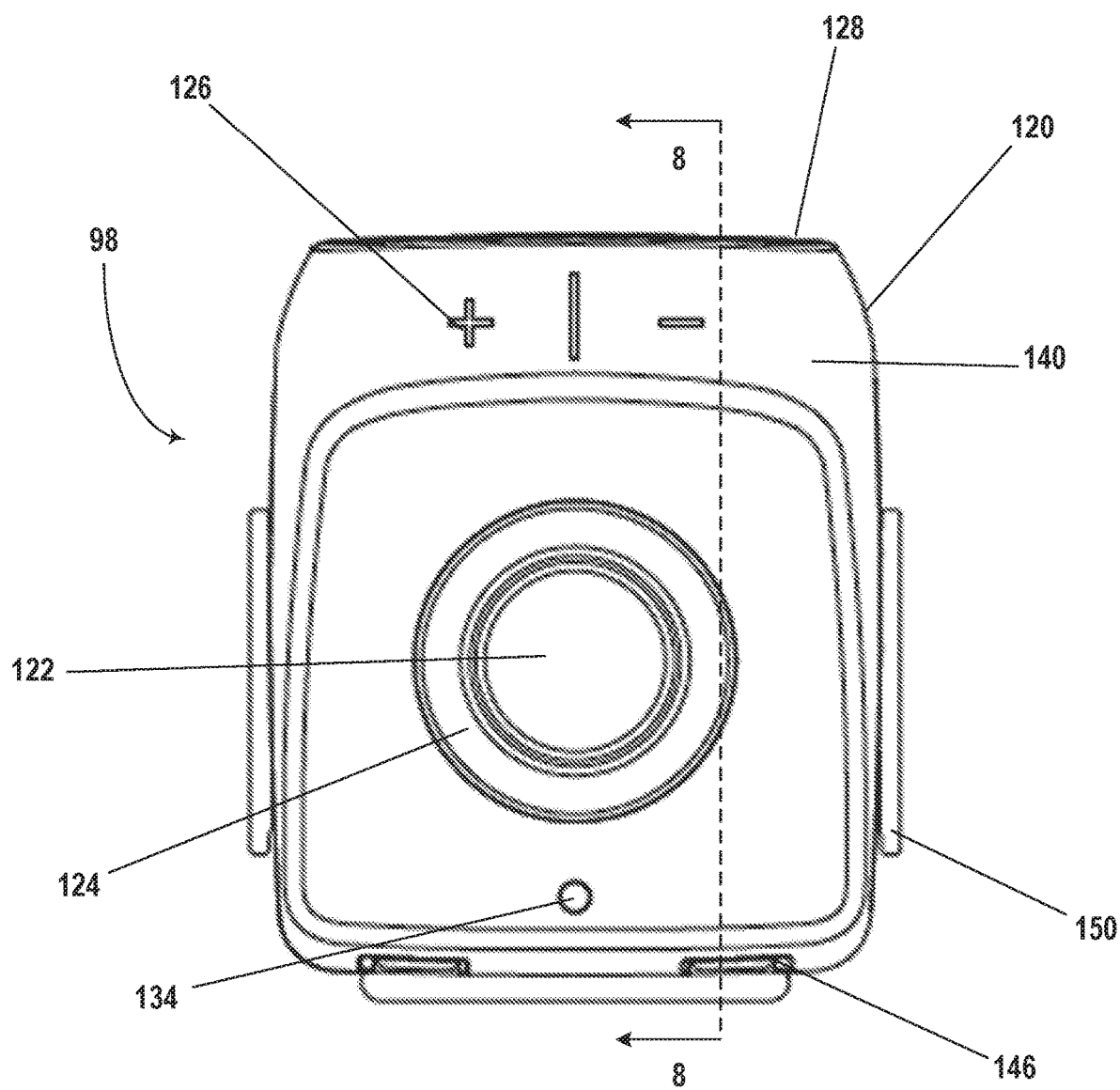
FIG. 8 is a top view of an example of an electrical control device attached to a mounting bracket.

Referring to FIGS. 5 and 6, the mounting bracket 150 may be attached to the protective housing 120 of the control device 98 with any number of fasteners. For example, the mounting bracket 150 may be attached to the protective housing 120 of the control device 98 with one or more bolts or screws 152 (e.g., a bolt). For example, as shown in FIG. 4, an opening 154 in the protective housing 120 (e.g., the portion 140 of the protective housing 120) of the control device 98 may support a threaded insert 156 (e.g., a bushing). The opening 154 may be, for example, a blind hole. The bolt 152 extends through an opening in the mounting bracket 150 and engages with the threaded insert 156 to attach the control device 98 to the mounting bracket 150. The mounting bracket 150 may be attached to the control device in other ways.

The mounting bracket 150 may be any number of sizes, shapes, and/or may be made of any number of materials. The size and/or shape of the mounting bracket 150 may be set based on the size and/or shape of the control device 98 to be attached to the mounting bracket 150 and/or the size and/or shape of the bicycle (e.g., the bicycle 50) to which the mounting bracket 150 is to be attached. In one embodiment, the mounting bracket 150 is rigid (e.g., made of a rigid plastic), and a portion 158 of the mounting bracket 150 is shaped to match an outer surface of a portion of the bicycle 50 (e.g., the handlebars 68). For example, the portion 158 of the mounting bracket 150 may have curved or interfacing corollary surfaces for attachment of the mounting bracket 150 to the bicycle 50. The mounting bracket 150 may also include ridges 159 to aid in the positioning of the mounting bracket 150 relative to the portion of the bicycle 50 (e.g., the handlebars 68), for example. The mounting bracket 150 may be for a specific type, style, or configuration of bicycle, or may be adaptable to any type, style, or configuration of bicycle.

Figure 9:
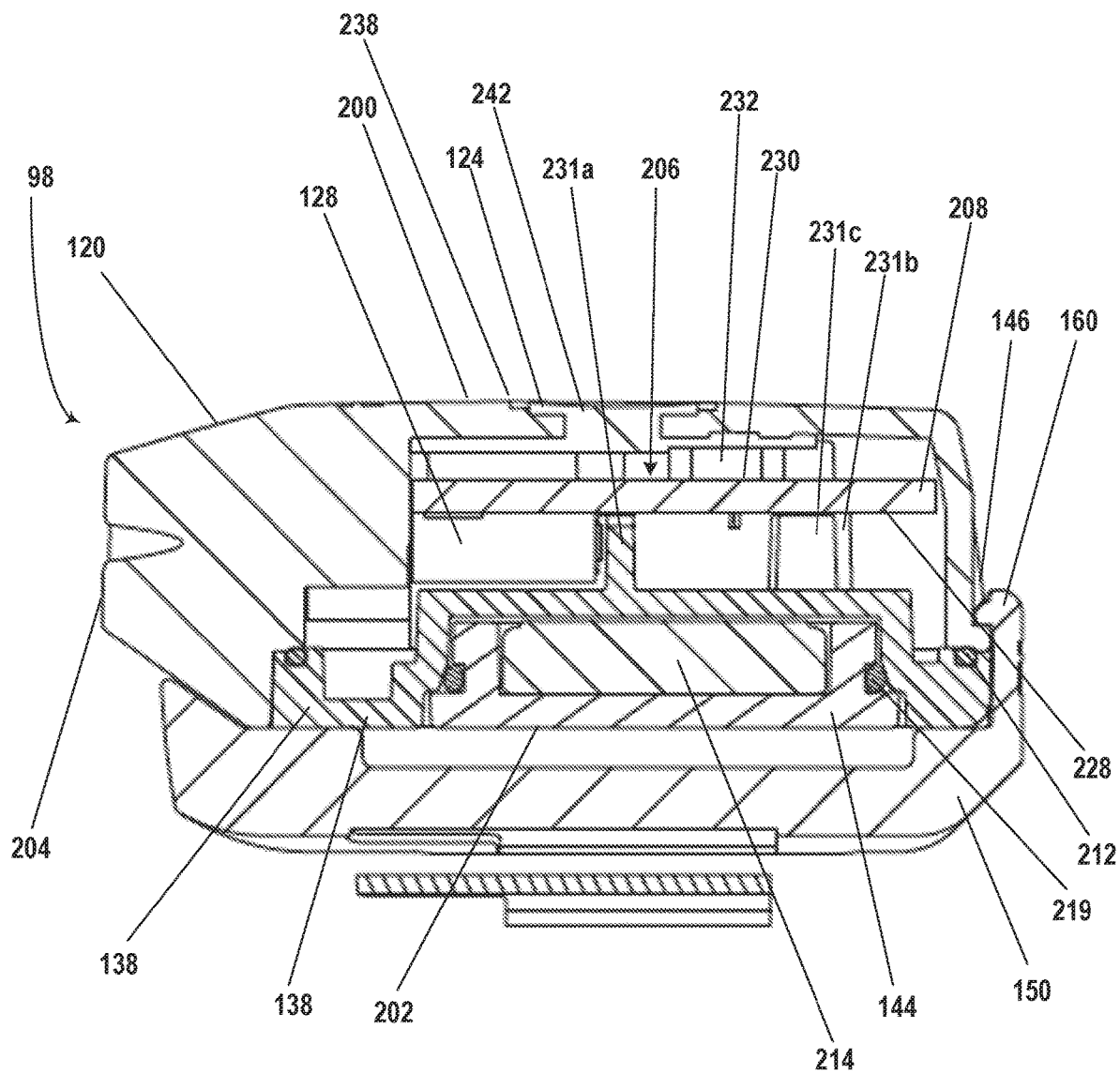
FIG. 9 is a cross-section view taken along axis 8 of the electrical control device and the mounting bracket of FIG. 8.

Referring to the example shown in FIG. 9, the mounting bracket 150 may include control device mounting portions 160 that interact with the receiving portions 146 on the protective housing 120 to aid in the positioning of the control device 98 relative to the mounting bracket 150 and the attachment of the control device 98 to the mounting bracket 150. The control device mounting portions 160 and the receiving portions 146 may be provided in any number of forms. For example, as shown in the example of FIG. 9, the control device mounting portions 160 include one or more hooks, and the receiving portions 146 include one or more openings within the protective housing 120 (e.g., the portion 140 of the protective housing 120) of the control device 98, into which the one or more hooks are insertable. In the examples shown in FIGS. 5-12, the control device mounting portions 160 include two hooks that are inserted into two corresponding openings within the protective housing 120 of the control device 98. The control device mounting portions 160 and/or the receiving portions 146 may be provided in other forms.

Figure 10:
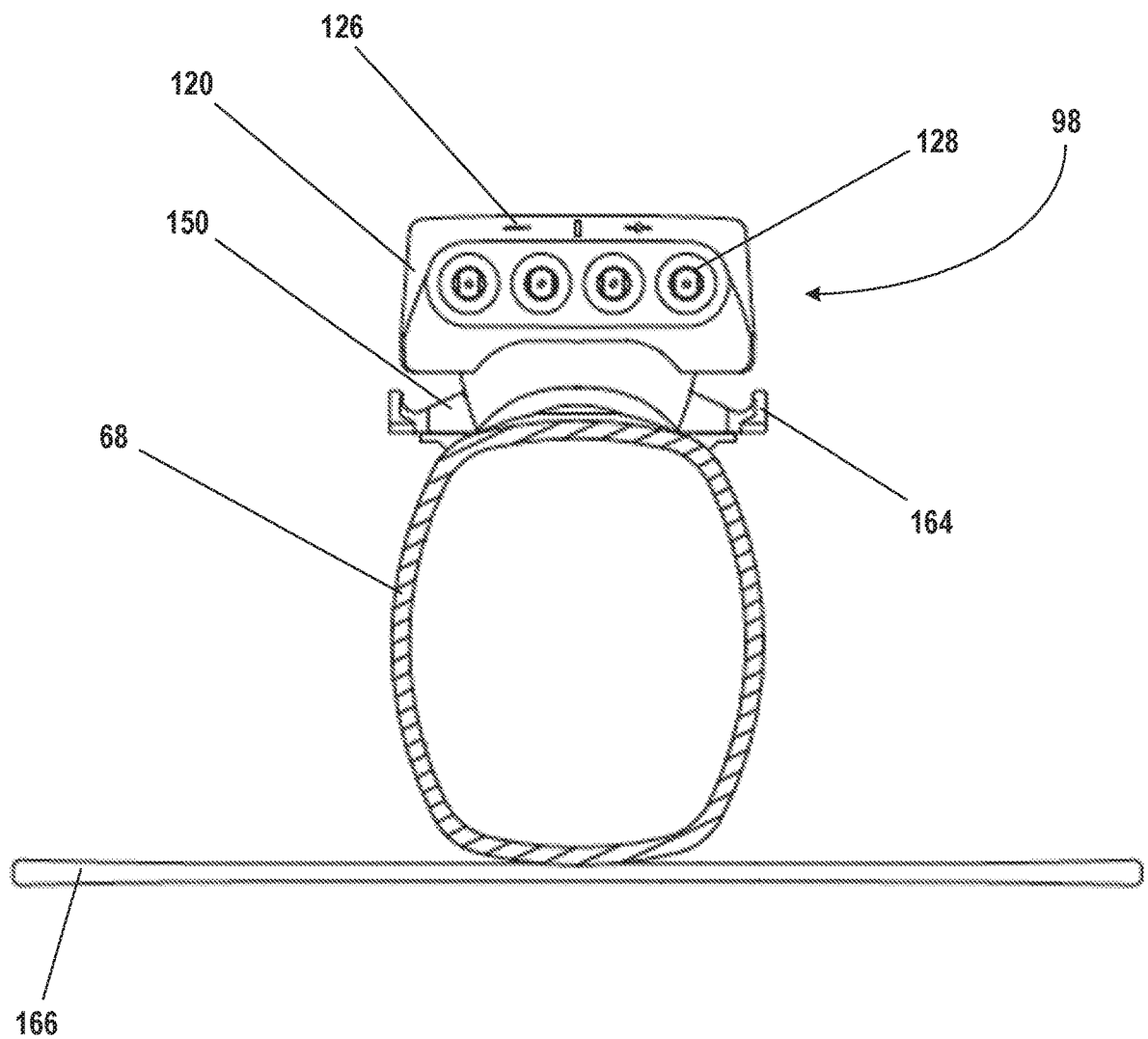
FIG. 10 is a front view of an example of an electrical control device attached to a mounting bracket positioned on part.
Figure 11:
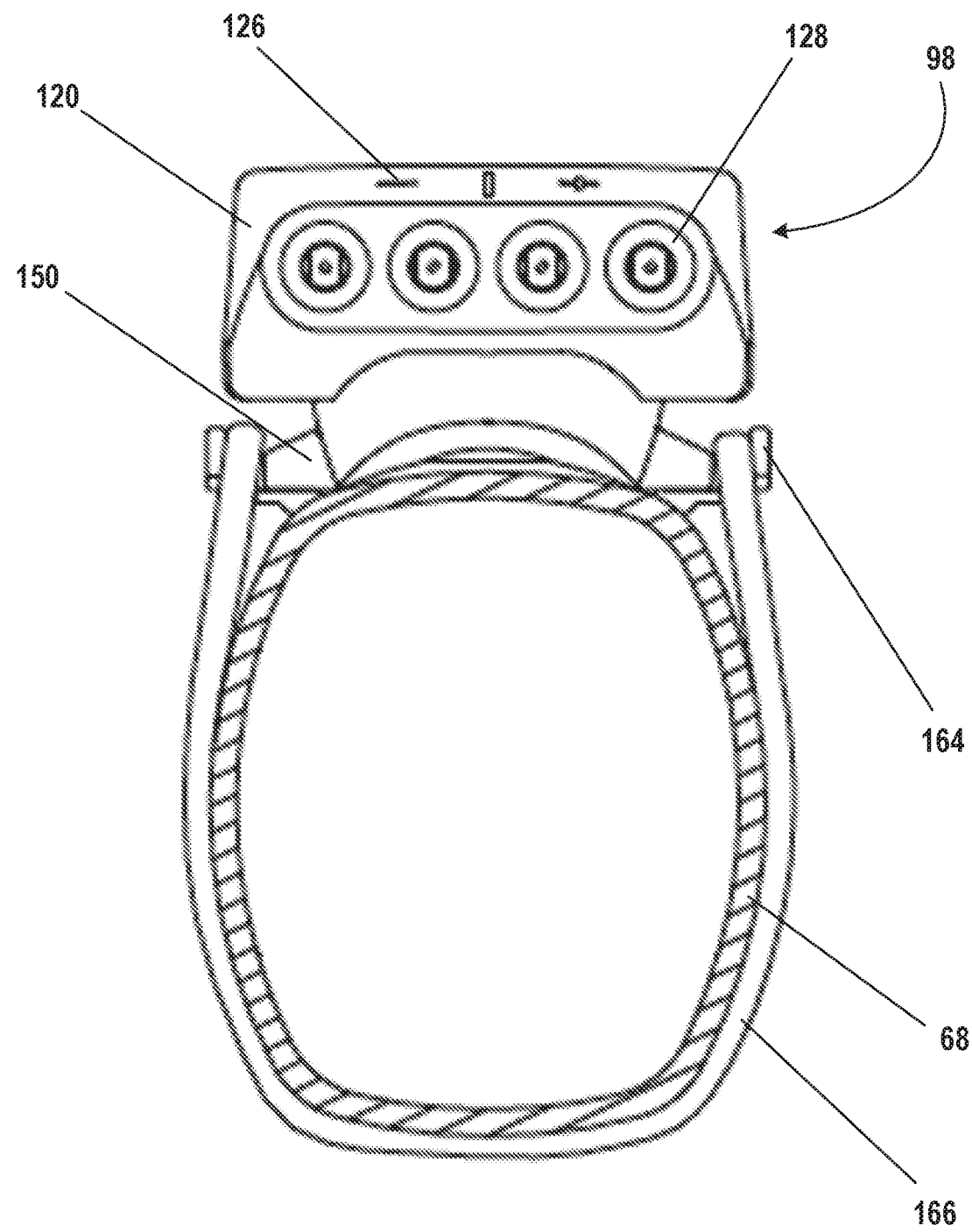
FIG. 11 is a front view of an example of an electrical control device attached to a mounting bracket mounted to part of a bicycle.
Figure 12:
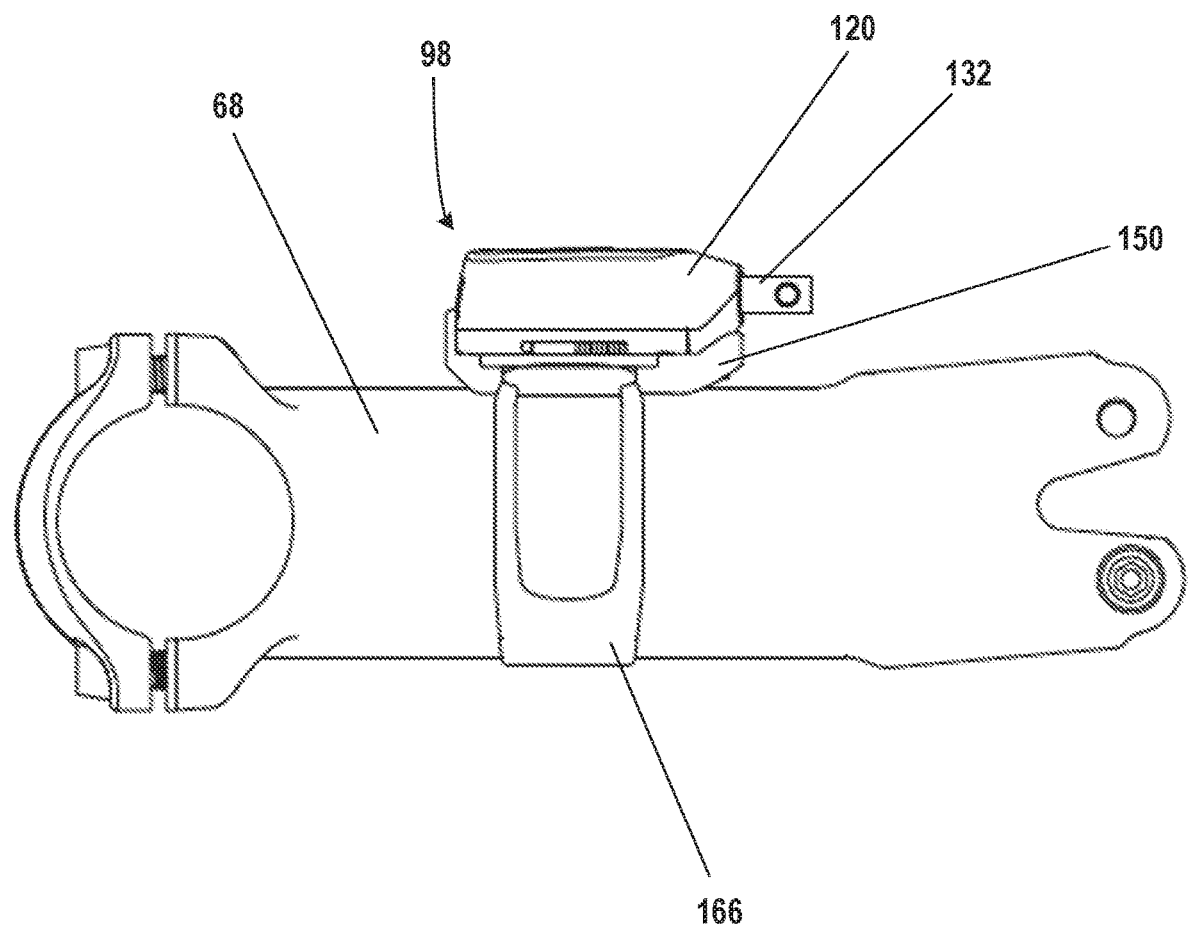
FIG. 12 is a side view of an example of an electrical control device attached to a mounting bracket mounted to part of a bicycle.

Referring to FIGS. 10-12, the mounting bracket 150 also includes one or more bicycle mounting portions 164. The bicycle mounting portions 164 are, for example, hooks 165 disposed on opposite sides of the mounting bracket 150. The bicycle mounting portions 164 may be disposed on additional, fewer, and/or different locations on the mounting bracket 150. The bicycle mounting portions 164 may include additional, fewer, and/or different components.

A mounting band or strap 166 (e.g., a strap) may be used to attach the mounting bracket 150, and the control device 98 attached to the mounting bracket 150, to the bicycle 50 (e.g., the handlebars 68), for example. The strap 166 may be sized specifically for particular bicycles or may be adjustable for different bicycles (e.g., includes different openings within the strap 166 for different diameters of the handlebars 68, respectively). The strap 166 is flexible and may be made of any number of materials. In one embodiment, the strap 166 is a zip tie or a cable tie.

Referring to FIGS. 11 and 12, the strap 166 is wrapped around the handlebars 68, for example, and the bicycle mounting portions 164 of the mounting bracket 150 are inserted through corresponding openings within the strap 166. The hooks 165 of the mounting bracket 150 keep the strap 166 attached to the mounting bracket 150 and thus, the control device 98 attached to the handlebars 68, for example. The mounting bracket 150 may be mounted to a bicycle in other ways.

Figure 13:
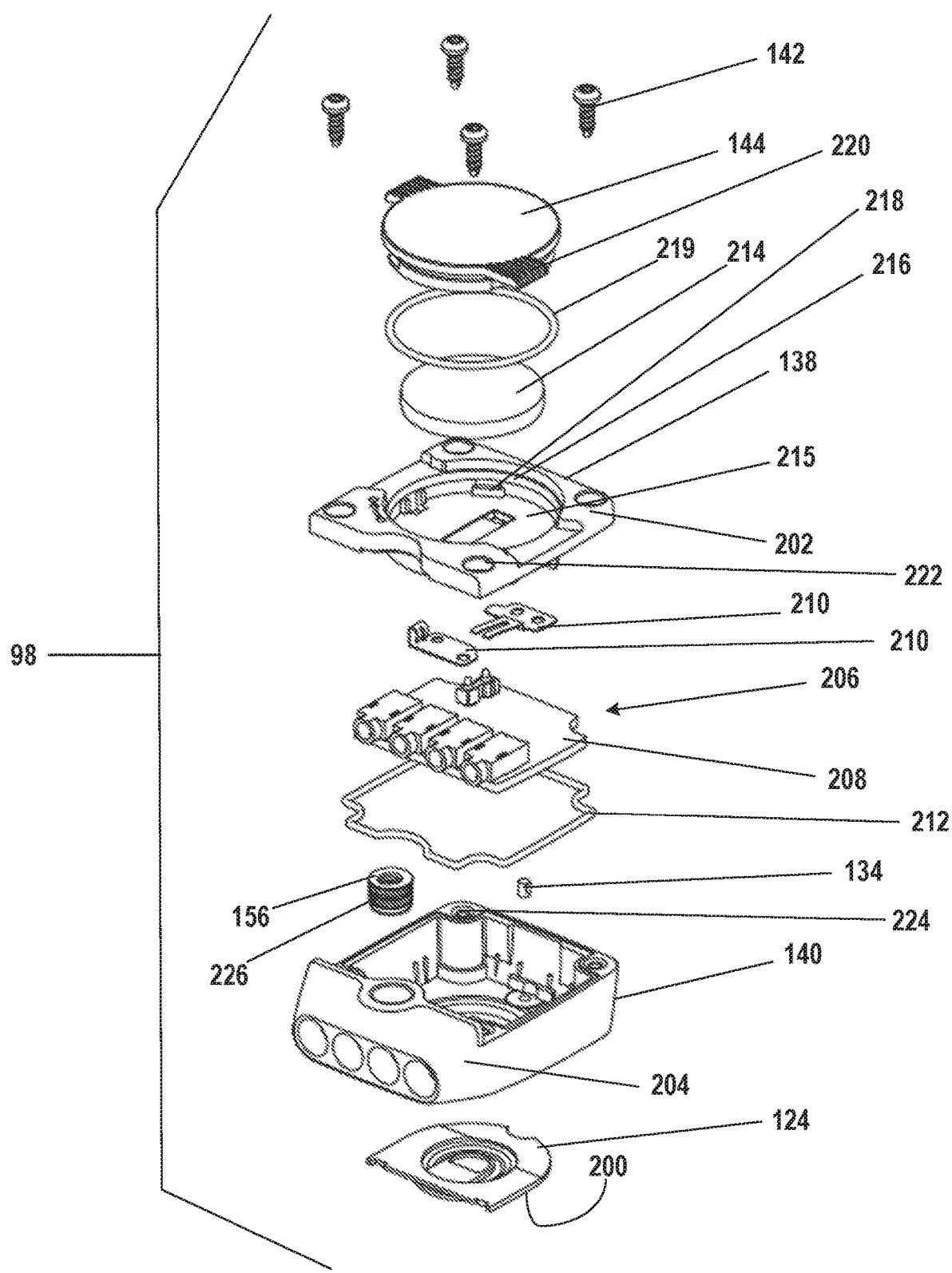
FIG. 13 is a first exploded perspective view of an example of an electrical control device.
Figure 14:
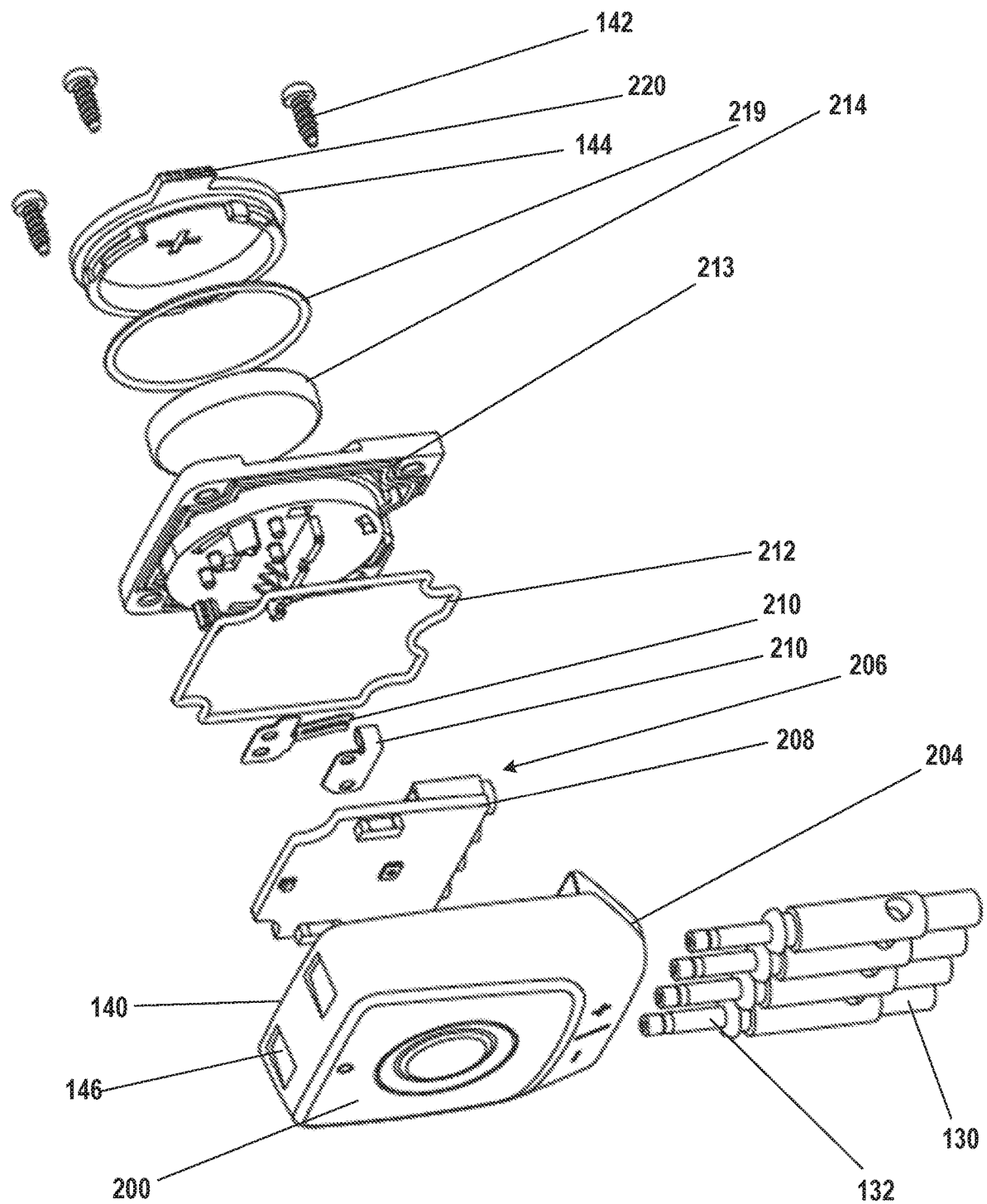
FIG. 14 is a second exploded perspective view of an example of an electrical control device.
Figure 15:
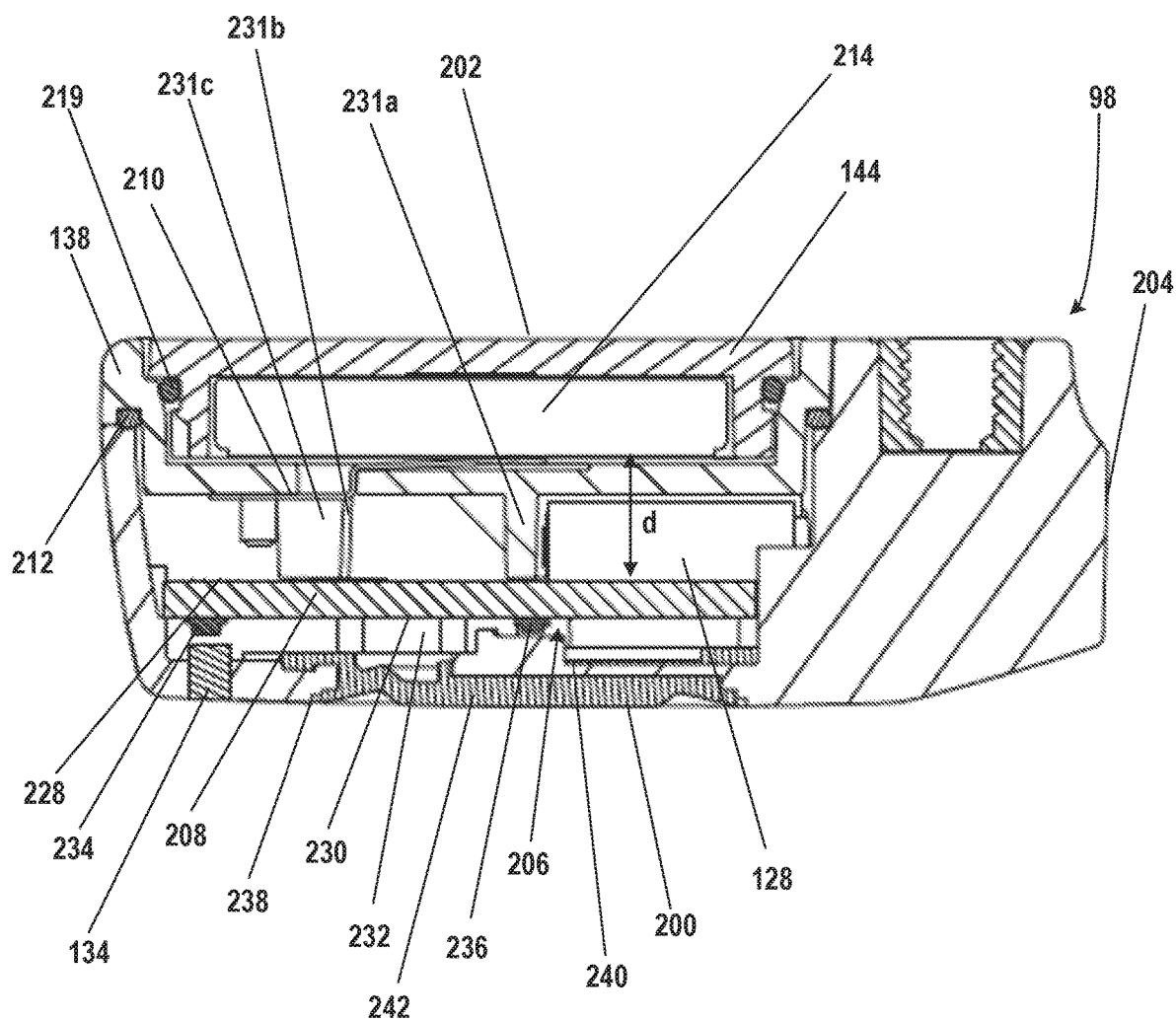
FIG. 15 is a cross-section view taken along axis 3 of the electrical control device of FIG. 3.

Referring to FIGS. 13-15, the control device 98 has a first side 200, a second side 202, and at least one third side 204 extending between the first side 200 and the second side 202. The portion 140 of the protective housing 120 and at least a portion of the actuation button 124 supported by the portion 140 of the protective housing 120 form the first side 200 of the control device 98, and the battery housing 138 of the protective housing 120 and the battery cover 144 form the second side 202 of the control device 98.

The control device 98 includes an assembly 206 supported within the protective housing 120. The assembly 206 is supported within the protective housing 120, between the portion 140 of the protective housing 120 and the battery housing 138. The assembly 206 includes a substrate 208 and circuitry embedded within and/or attached to the substrate 208.

The control device 98 also includes the LED light tube 134 and electrical contacts 210 supported within the protective housing 120 (e.g., between the portion 140 of the protective housing 120 and the battery housing 138). A seal 212 (e.g., a rubber gasket) is disposed between the portion 140 of the protective housing 120 and the battery housing 138 to, for example, prevent debris and moisture from reaching the assembly 206. Referring to FIG. 14, the battery housing 138 may include a channel 213 in which the gasket 212 is positionable. More, fewer, and/or different components may be included within the control device 98, between the portion 140 of the protective housing 120 and the battery housing 138.

The battery housing 138 supports a power supply 214. In the example shown in FIGS. 13 and 14, the power supply 214 is a removable battery. Other power supplies may be used to power the control device 98. The battery housing 138 includes a first recess 215 extending from the second side 202 of the control device 98 into the battery housing 138. The first recess 215 is at least partially defined by a wall 216. Alignment features 218 may extend away from the wall 216 to aid in the positioning of the removable battery 214 relative to the battery housing 138, for example.

A seal 219 (e.g., a rubber gasket or an O-ring) is disposed between the battery cover 144 and the battery housing 138 to, for example, prevent debris and moisture from reaching the removable battery 214. The battery cover 144 may include one or more tabs 220 that are slidable and rotatable relative to the battery housing 138 to move the battery cover 144 between a locked position and an unlocked position. In the unlocked position, the battery cover 144 may be translated in a direction away from the battery housing 138. In other words, in the unlocked position, the battery cover 144 may be removed from the battery housing 138.

Fasteners, for example screws 142, are used to attach the battery housing 138 to the portion 140 of the protective housing 120. The screws 142 attach the battery housing 138 to the portion 140 of the protective housing 120 via corresponding openings 222 in the battery housing 138 and corresponding openings 224 in the portion 140 of the protective housing 120. The openings 222 in the battery housing 138 and/or the openings 224 in the portion 140 of the protective housing 120 may be threaded openings. The example of FIG. 13 shows four screws 142. More or fewer fasteners may be provided to attach the battery housing 138 to the portion 140 of the protective housing 120. The battery housing 138 may be attached to the portion 140 of the protective housing 120 in other ways (e.g., with an adhesive).

The bushing 156 may include, for example, a knurled outer surface 226. The knurled outer surface 226 of the bushing 156 helps prevent rotation of the bushing 156 relative to the protective housing 120 once the bushing 156 is installed within the portion 140 of the protective housing 120. For example, when the mounting bracket 150 is attached to the control device 98 via the bushing 156, the bolt 152, for example, may be torqued to secure the control device 98 to the mounting bracket 150. The knurled outer surface 226 of the bushing 156 helps prevent rotation of the bushing 156 relative to the portion 140 of the protective housing 120 during this attachment process.

The bushing 156 may be attached to the portion 140 of the protective housing 120 in any number of ways. For example, the bushing 156 may be attached to the portion 140 of the protective housing 120, within the opening 154, with an adhesive and/or by press fitting the bushing 156 within the opening 154 of the portion 140 of the protective housing 120. In one embodiment (see FIG. 15), the bushing 156 has a partially closed bottom. In other words, a through hole extending through the bushing 156 has a smaller size (e.g., diameter) on one side of the bushing 156 compared to the other side of the bushing 156. The partially closed bottom of the bushing 156 prevents damage to the protective housing 120 from over-threading the bolt 152, for example.

Referring to FIG. 15, the removable battery 214 is disposed at a distance d from the substrate 208 and is electrically connected to the circuitry of the assembly 206 via the electrical contacts 210, which extend through the battery housing 138 (e.g., via one or more openings through the battery housing 138). The substrate 208 may be any number of sizes and/or shapes. The substrate 208 has a first surface 228 and a second surface 230 opposite the first surface 228 (e.g., opposite surfaces).

The battery housing 138, and thus the removable battery 214, are opposite the first surface 228 of the substrate 208. The first surface 228 of the substrate 208 supports and/or contacts one or more of the ports 128 (e.g., four connectors). The four connectors 128 may transfer power and/or data to components on the bicycle 50, for example. The four connectors 128, for example, may be positioned relative to each other in any number of ways. For example, the four connectors 128 may be positioned on the substrate 208, in line with each other. The connectors 128 may be positioned relative to each other in different ways.

In an embodiment, the connectors 128 (e.g., a size of each connector 128 and a number of the connectors 128) drives a height and a width of the control device 98. The removable battery 214 (e.g., a size of the removable battery 214) drives a length of the control device 98.

The battery housing 138 includes one or more supports 231 extending away from the battery housing 138 and towards the first surface 228 of the substrate 208. For example, the battery housing 138 includes three supports 231 (e.g., supports 231a, 231b, and 231c) extending away from the battery housing 138 and towards the first surface 228 of the substrate 208.

In one embodiment, when the control device 98 is assembled, a first support 231a abuts or is adjacent to the first surface 228 of the substrate 208. The first support 231a also abuts or is adjacent to the four connectors 128. The positioning of the first support 231a relative to the connectors 128 supported by the substrate 208 provides support for the connectors 128 when the connectors 132 are inserted into the connectors 128. In other words, the first support 231a acts as a back stop for a connector 128 supported by the substrate 208 when a force is applied to the connector 128.

The second surface 230 of the substrate 208 supports one or more communication devices 232 (e.g., antennas). For example, the second surface 230 of the substrate 208 supports two antennas 232. The second surface 230 of the substrate 208 may support additional components such as, for example, an LED 234 communicating with the light tube 134, and a switch 236 (e.g., a button contact). The four connectors 128, the two antennas 232, the LED 234, and/or the switch 236 may communicate via the circuitry of the substrate 208. The substrate 208 (e.g., the first surface 228 and/or the second surface 230) may support additional, fewer, and/or different components.

The protective housing 120 includes an opening 238 opposite the second surface 230 of the substrate 208. The opening 238 extends through the protective housing 120. The opening 238 may be any number of sizes and/or shapes. For example, the opening 238 may be circular in shape.

The protective housing 120 includes a tab 240 that extends into the opening 238. When the control device 98 is assembled, the tab 240 is opposite the switch 236 (e.g., abuts or is adjacent to the switch 236). The tab 240 is bendable, and at least a portion of the tab 240 is movable relative to the switch 236, such that the switch 236 is activatable by the tab 240.

The positioning of the first support 231a relative to the substrate 208 also provides support for the substrate 208 when a force is applied to the button contact 236. For example, when a user applies a force to the actuation surface 122 (e.g., the actuation button 124) to activate the button contact 236, the first support 231a supports the substrate 208 from beneath the substrate 208 and reduces flexing of the substrate 208.

In one embodiment, the actuation surface 122 (e.g., the actuation button 124) is formed by an overmold button 242 that is physically connected to the protective housing 120. The overmold button 242 may be physically connected to the protective housing 120 in any number of ways including, for example, with an adhesive. The overmold button 242 is manufactured with an overmolding processing. For example, a portion of the protective housing 120 and the tab 240 are covered by the overmold button 242, and the overmold button 242 fills the opening 238. In one embodiment, the overmold 242 is made of a first material, and at least a portion of the protective housing 120 surrounding the overmold button 242 (e.g., all of the protective housing 120) is made of a second material. The first material may have different material properties than the second material. In an embodiment, the first material may be softer (e.g. lower durometer values) than the second material. Also, or alternatively, the first material may be more elastic than the second material. For example, the first material may be an elastomer (e.g. a natural or synthetic rubber), and the second material may be a plastic or metal.

Actuation buttons of the prior art include separate button actuator components and seals, which increases the size of a control device. The overmold button 242 of the present embodiments acts as a water seal and a diaphragm for a button actuator (e.g., the tab 240, which interacts with the switch 236). This configuration enables a hard surface (e.g., via the tab 240) for improved haptic response by the user.

Figure 16:
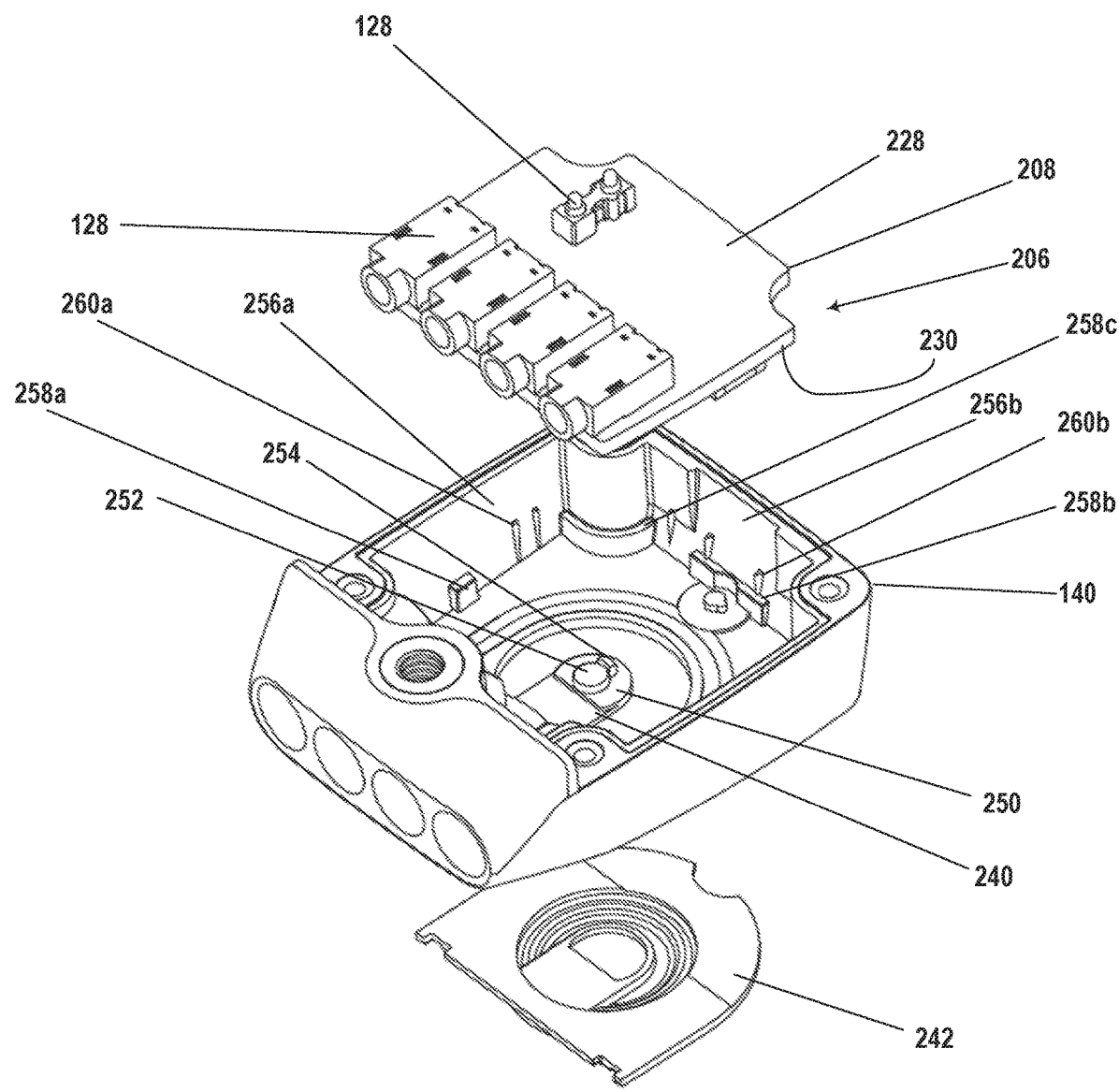
FIG. 16 is a first partial exploded perspective view of an example of an electrical control device.

With reference to FIG. 16, the tab 240 has a surface 250 that faces away from the overmold button 242. A first extension 252 and a second extension 254 extend away from the surface 250 of the tab 240. The first extension 252 (e.g., a pip) interacts with the switch 236 when the user presses the overmold button 242, and the second extension 254 may interact with the second surface 230 of the substrate 208 when the user presses the overmold button 242. In one embodiment, the second extension 254 has a greater height relative to the surface 250 of the tab 240 compared to the first extension 252. The greater height of the second extension 254 compared to the first extension 252 prevents bottoming out and thus, damage to the switch 236 and/or the substrate 208.

The protective housing 120 (e.g., the portion 140 of the protective housing 120) includes one or more inner surfaces 256 that form a recess into which the substrate 208 is positionable. The protective housing 120 includes one or more supports 258 and one or more tolerance features 260 (e.g., crush ribs) extending away from the one or more inner surfaces 256, respectively. The one or more supports 258 help support the substrate 208 when the substrate 208 is positioned within the protective housing 120, and may aid in alignment of, for example, the connectors 128 with corresponding openings through the protective housing 120. The tolerance features 260 aid in the positioning of the substrate within the protective housing 120, for example, causing the assembly of the parts to be more tolerant of dimensional variances of the substrate 208 and/or the protective housing 120.

As shown in the example of FIG. 16, the protective housing 120 may include multiple supports, for example at least five supports 258. A first support 258a extends away from a first inner surface 256a of the protective housing 120, a second support 258b extends away from a second inner surface 256b of the protective housing 120, and a third support 258 extends away form a third inner surface (not shown) of the protective housing 120. A fourth support 258c extends between the first inner surface 256a and the second inner surface 256b, and a fifth support 258 extends between the second inner surface 256b and the third inner surface (not shown). The supports 258 may be any number of sizes and/or shapes. More, fewer, and/or different (e.g., extending from different surfaces within the protective housing 120) supports may be provided within the protective housing 120.

As shown in the example of FIG. 16, the protective housing 120 may include at least eight tolerance features 260 (only six shown in FIG. 16) positioned across three inner surfaces 256 of the protective housing 120. For example, two tolerance features 260a extend away from the first inner surface 256a of the protective housing 120, three tolerance features 260b extend away from the second inner surface 256b of the protective housing 120, and two tolerance features extend away from the third inner surface (not shown) of the protective housing 120. The tolerance features 260 may be any number of sizes and/or shapes. More, fewer, and/or different (e.g., extending from different surfaces within the protective housing 120) tolerance features may be provided within the protective housing 120.

Figure 17:
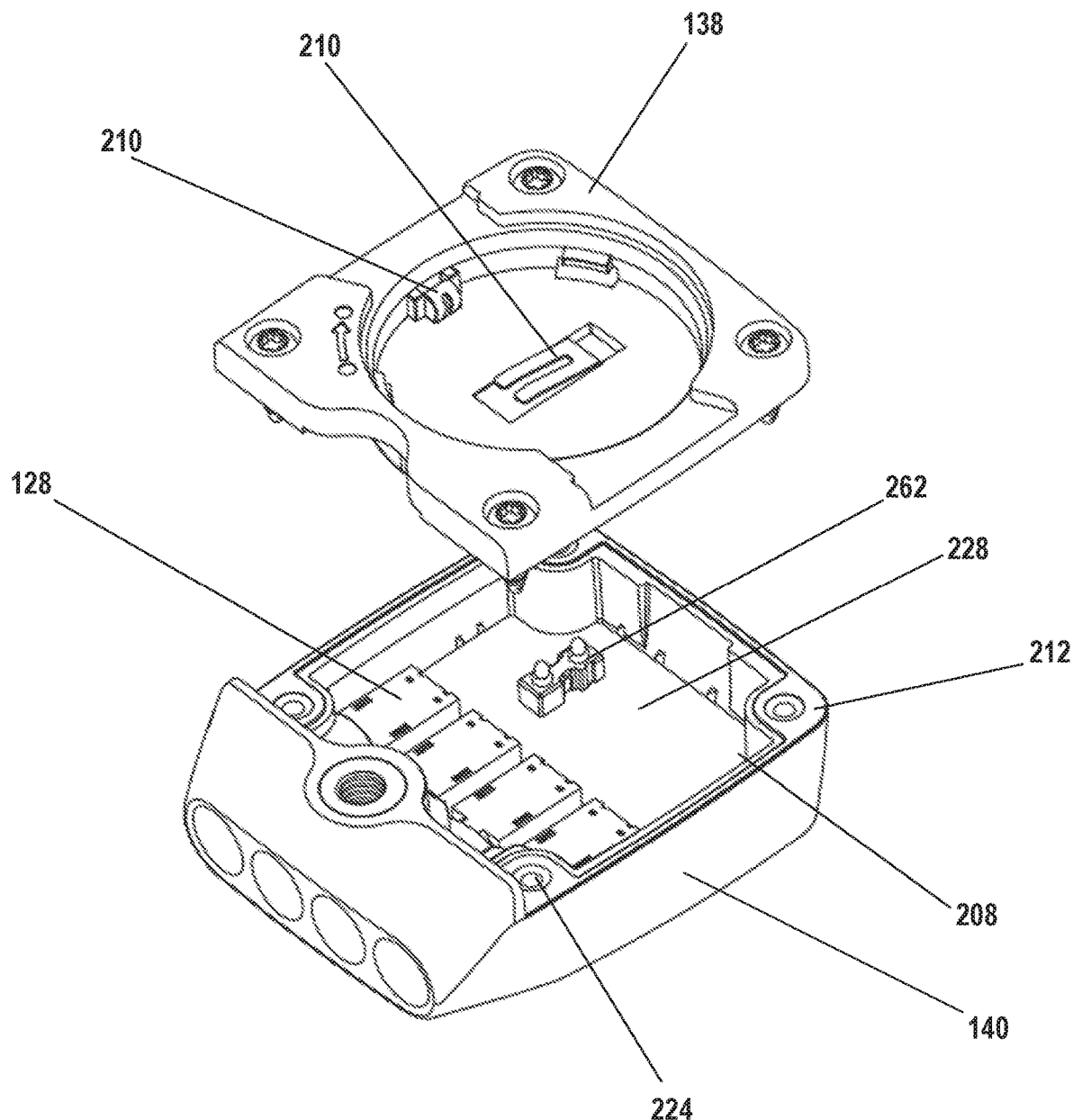
FIG. 17 is a second partial exploded perspective view of an example of an electrical control device.

With reference to FIG. 17, when the substrate 208 is positioned within the protective housing 120 (e.g., the portion 140 of the protective housing 120), the second surface 230 of the substrate 208 abuts the five supports 258 (see FIG. 17), for example, such that the substrate 208 is supported and the connectors 128 are aligned with the corresponding openings within the protective housing 120. When the substrate 208 is positioned within the protective housing 120, the substrate 208 also abuts and may deform the tolerance features 260 (see FIG. 17).

Battery contacts 262 are supported by and electrically connected to the first surface 228 of the substrate 208. The battery contacts 262 may be, for example, battery spring contacts. Other battery contacts may be used. Portions of the electrical contacts 210 extend through corresponding openings within the battery housing 138, respectively, and the portions of the electrical contacts 210 abut the removable battery 214 when the removable battery 214 is positioned within the battery housing 138.

Figure 18:
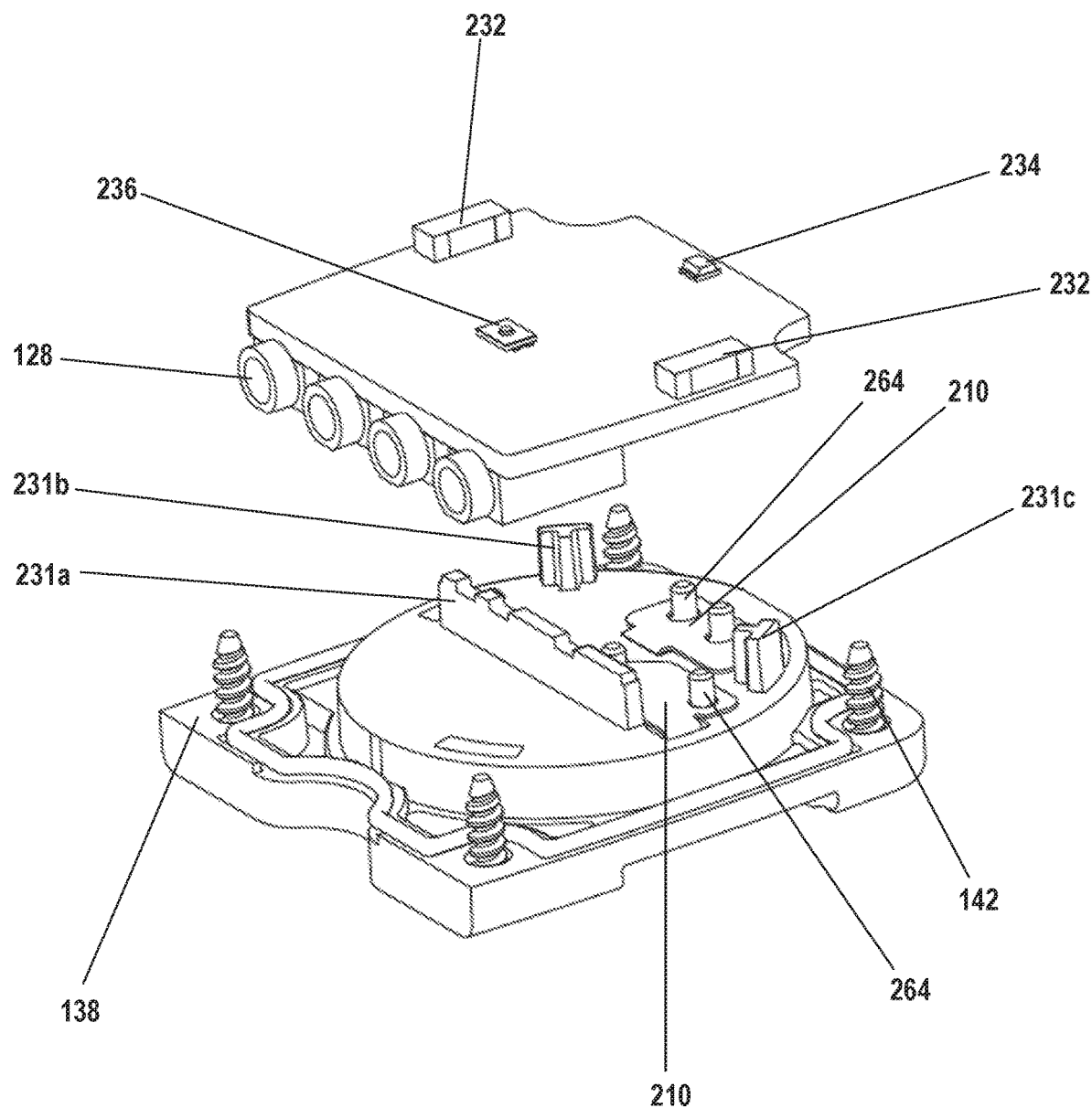
FIG. 18 is a third partial exploded perspective view of an example of an electrical control device.

With reference to FIG. 18, the battery housing 138 includes one or more electrical contact alignment features 264 (e.g., four posts) extending away from the battery housing 138. The four posts 264, for example, extend through corresponding openings through the electrical contacts 210, respectively, and help retain the electrical contacts 210 on the battery housing 138 and align the electrical contacts 210 relative to the battery housing 138. The four posts 264, for example, may be any number of shapes (e.g., cylindrical), sizes, and/or made of any number of materials. For example, the four posts 264 may be made of a same material as the battery housing 138. The electrical contacts 210, and thus the removable battery 214 when the removable battery 214 is positioned within the battery housing 138, are electrically connected to the substrate 208 via the battery contacts 262. In another embodiment, the posts 264 are made of a different material than the battery housing 138.

With reference to FIG. 17, the attachment of the battery housing 138 to the remaining portion 140 of the protective housing 120, with the gasket 212 therebetween, via the screws 142 and the corresponding tapped openings 224 positions the battery housing 138 and the removable battery 214 positioned therein above the substrate 208. The stacked positioning of the removable battery 214 relative to the substrate 208 allows for a compact design of the control device 98. With reference to FIG. 18, the stacked positioning of the removable battery 214 relative to the substrate 208 also maximizes performance of the communication devices 232 supported by and electrically connected to the substrate 208. The second surface 230 of the substrate 208 supports one or more (e.g., two) communication devices 232. The communication devices 232 are, for example, antennas. Increased separation between the removable battery 214 and the antennas 232 provided by the stacked configuration and the antennas 232 being provided on a surface of the substrate 208 facing away from the battery housing 138 (e.g., the second surface 230) maximizes the performance of the antennas 232.

Figure 19:
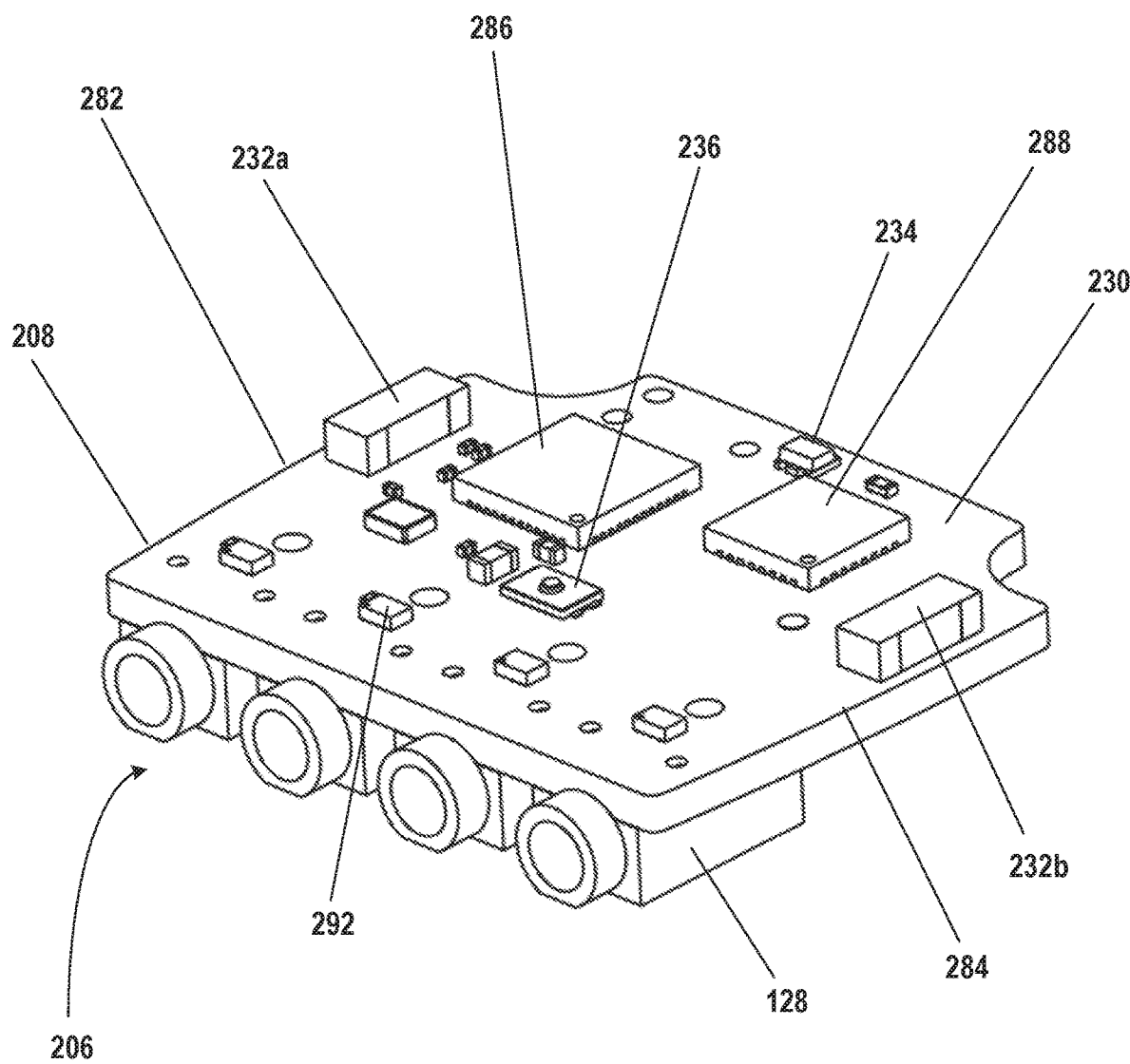
FIG. 19 is a first perspective view of an example of a substrate positionable within an electrical control device.
Figure 21:
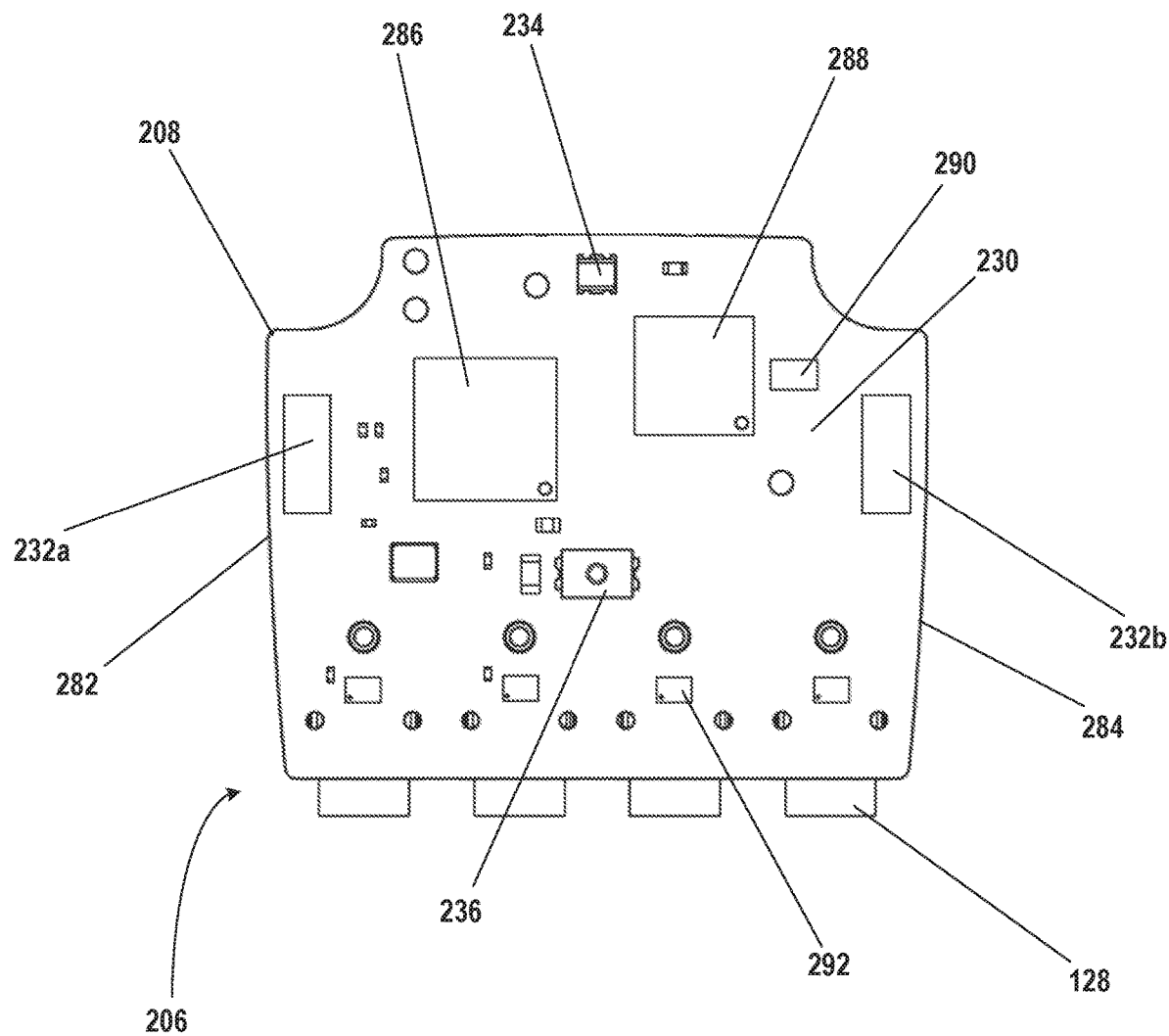
FIG. 21 is a bottom view of an example of a substrate positionable within an electrical control device.

With reference to FIGS. 19 and 21, the second surface 230 of the substrate 208 supports a first antenna 232a and a second antenna 232b. One antenna of the first antenna 232a and the second antenna 232b (e.g., the first antenna 232a) is configured to communicate with one or more components on the bicycle 50 operable to change a physical state of the bicycle 50. In other words, the first antenna 232a is configured to communicate with a network internal to the bicycle 50. For example, the first antenna 232a is for a dedicated connection, such a SRAMLINK™ connection using an AIREA™ wireless communication protocol. In one example, the first antenna 232a may communicate with the rear derailleur 80 to shift gears. The first antenna 232 may communicate with additional, fewer, and/or different components on the bicycle 50 operable to change a physical state of the bicycle 50.

The other antenna of the first antenna 232a and the second antenna 232b (e.g., the second antenna 232b) is configured to communicate with parts and/or network(s) external to the bicycle 50. For example, the second antenna 232b is for Bluetooth and/or Ant+ connections (e.g., to communicate with a mobile device). In an embodiment, the first antenna 232a may be configured to communicate using a different communication protocol than the second antenna 232b. For example, the first antenna 232a may be configured to communicate using an AIREA™ wireless communication protocol, while the second antenna 232b may be configured to communicate using Bluetooth and/or Ant+ wireless communication protocols.

In one example, the first antenna 232a and the second antenna 232b are different types of antennas. For example, the first antenna 232a and the second antenna 232b may be antennas with different theoretical maximum efficiencies. Larger antennas may have higher theoretical maximum efficiencies. The first antenna 232a may thus be a larger antenna than the second antenna 232b (e.g., the first antenna 232a may have a larger volume and/or communicating surface area). This difference may be due to the importance of the communication of control data by the first antenna 232a between the rear derailleur 80 to shift gears in contrast to relatively lower surety required for communicating values or other lower priority data using the second antenna 232b.

Antennas with higher theoretical maximum efficiencies may require a larger clearance area (e.g., a distance to an edge of the substrate 208) compared to antennas having lower theoretical maximum efficiencies. The first antenna 232a and the second antenna 232b may be chip surface mount antennas, which may provide sufficient antenna performance without requiring a very large clearance area. An antenna pattern for the first antenna 232a and the second antenna 232b may be omnidirectional, which provides maximum flexibility for orientation for the control device 98. Orientation flexibility for the control device 98 is to be provided, as the user may place the control device 98 at any of a number of different locations and/or orientations on the bicycle 50, for example.

A distance between the first antenna 232a and the second antenna 232b on the substrate may be maximized. If the first antenna 232a and the second antenna 232b are placed too close together, the first antenna 232a and the second antenna 232b may need to be tuned frequently, making optimization difficult and risking communication interference. In one embodiment, the first antenna 232a is supported by the second surface 230 of the substrate 208 at a first position, and the second antenna 232b is supported by the second surface 230 of the substrate 208 at a second position. The first position, for the first antenna 232a, and the second position, for the second antenna 232b, are adjacent to a perimeter of the second surface 230 of the substrate 208, respectively. The first position and the second position are at a distance from each other. In one example, the perimeter of the second surface 230 is at least partially defined by a first edge 282 and a second edge 284 opposite and at a distance from the first edge 282. The first antenna 232a is adjacent to (e.g., at a clearance distance from) the first edge 282, and the second antenna 232b is adjacent to (e.g., at a clearance distance from) the second edge 284.

The second surface 230 of the substrate 208 supports and/or electrically connects additional, fewer, and/or different components. For example, the second surface 230 of the substrate 208 may support a central processing unit 286 configured to generate and process signals for a wireless chip 288, also supported by the second surface 230 of the substrate 208. The second surface 230 of the substrate 208 may also support a combiner 290 (e.g., a balun) for combining two signals, general circuitry 292 for the connectors 128, the LED 234, and the switch 236. Other components may be supported by the second surface 230 of the substrate 208.

Figure 20:
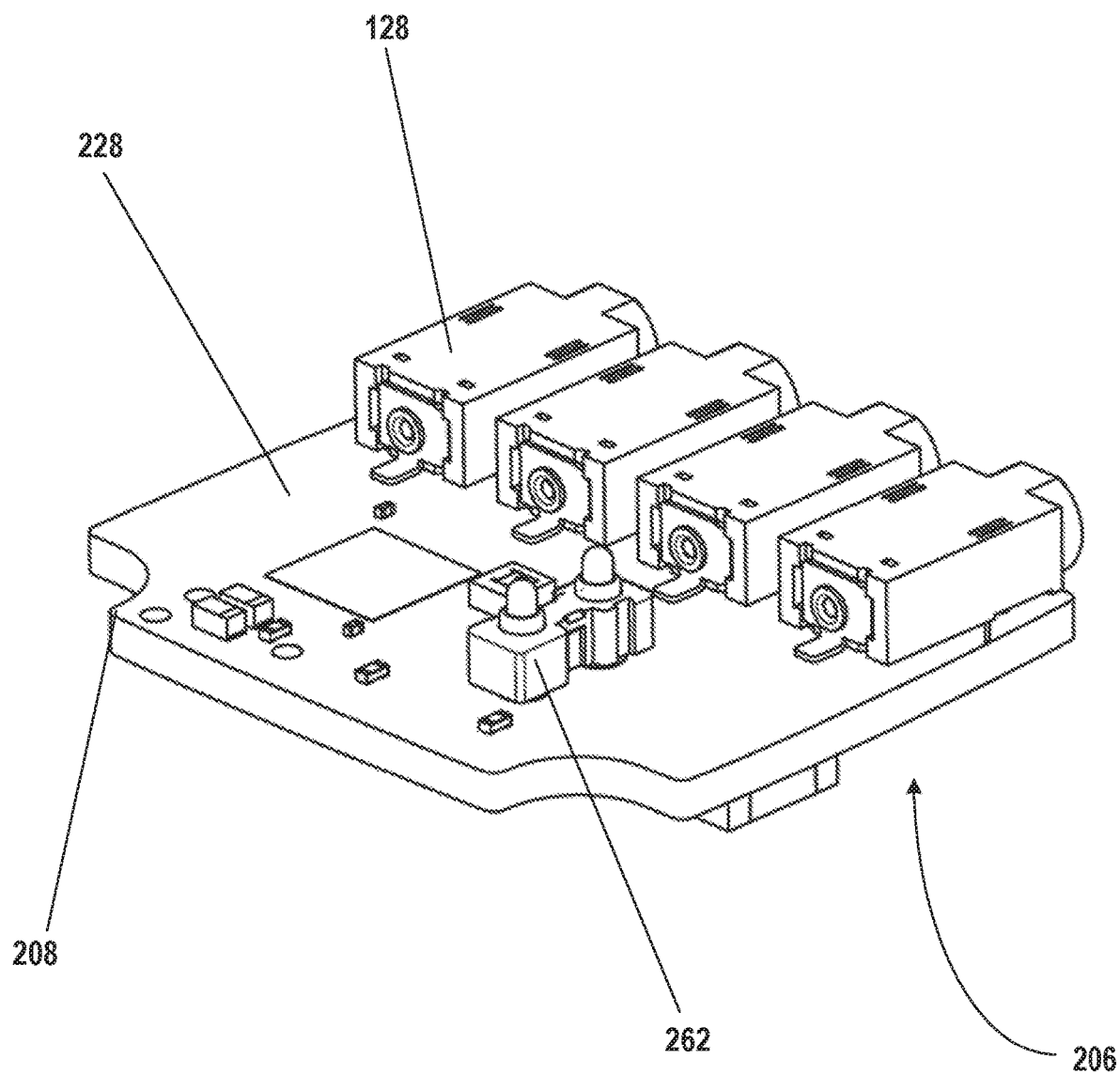
FIG. 20 is a second perspective view of an example of a substrate positionable within an electrical control device.
Figure 22:
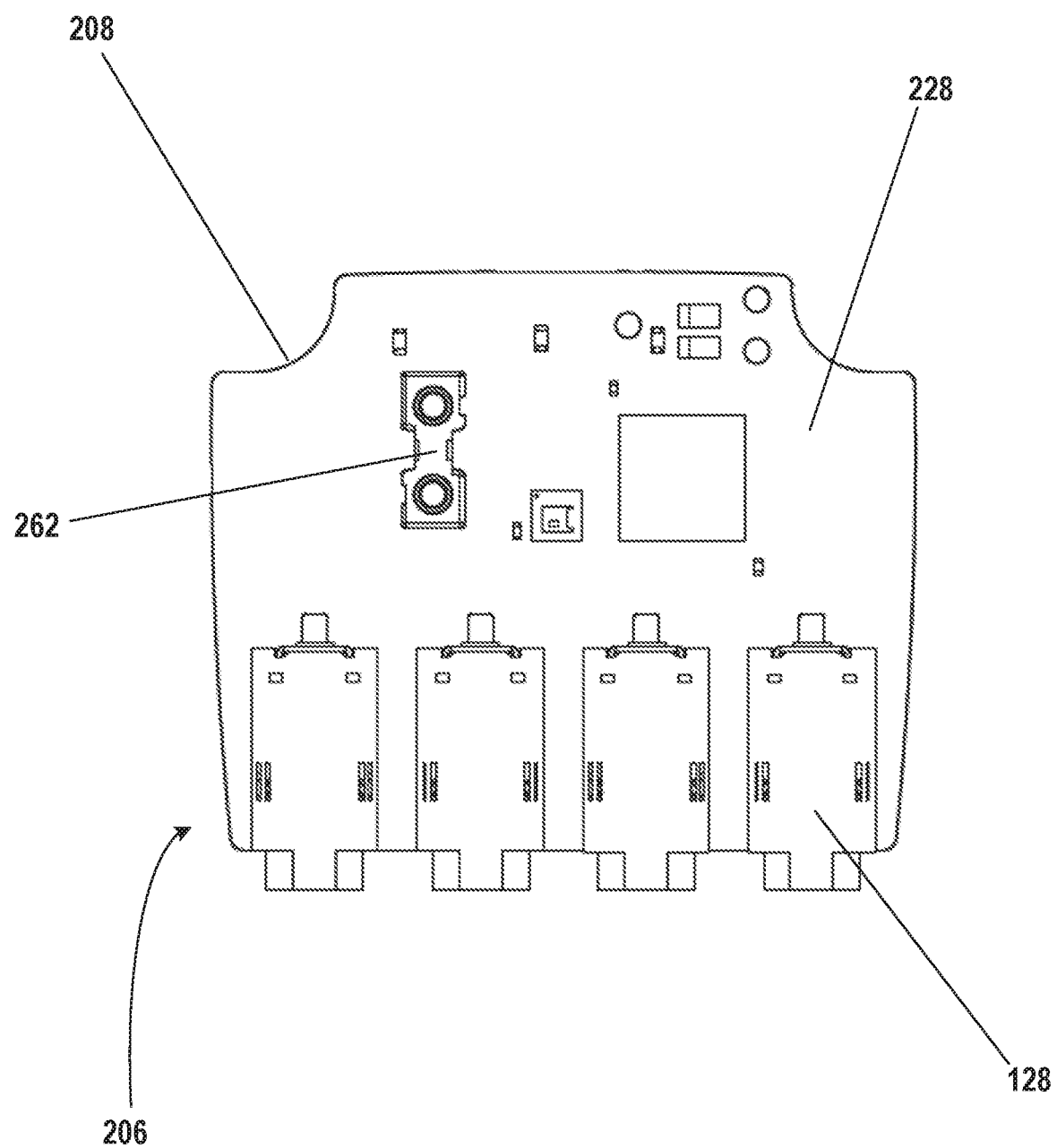
FIG. 22 is a top view of an example of a substrate positionable within an electrical control device.

With reference to FIGS. 20 and 22, the first surface 228 of the substrate 208 supports and/or electrically connects the connectors 128 and the battery contacts 262. The first surface 228 of the substrate 208 may support and/or electrically connect additional, fewer, and/or different components.

Figure 23:
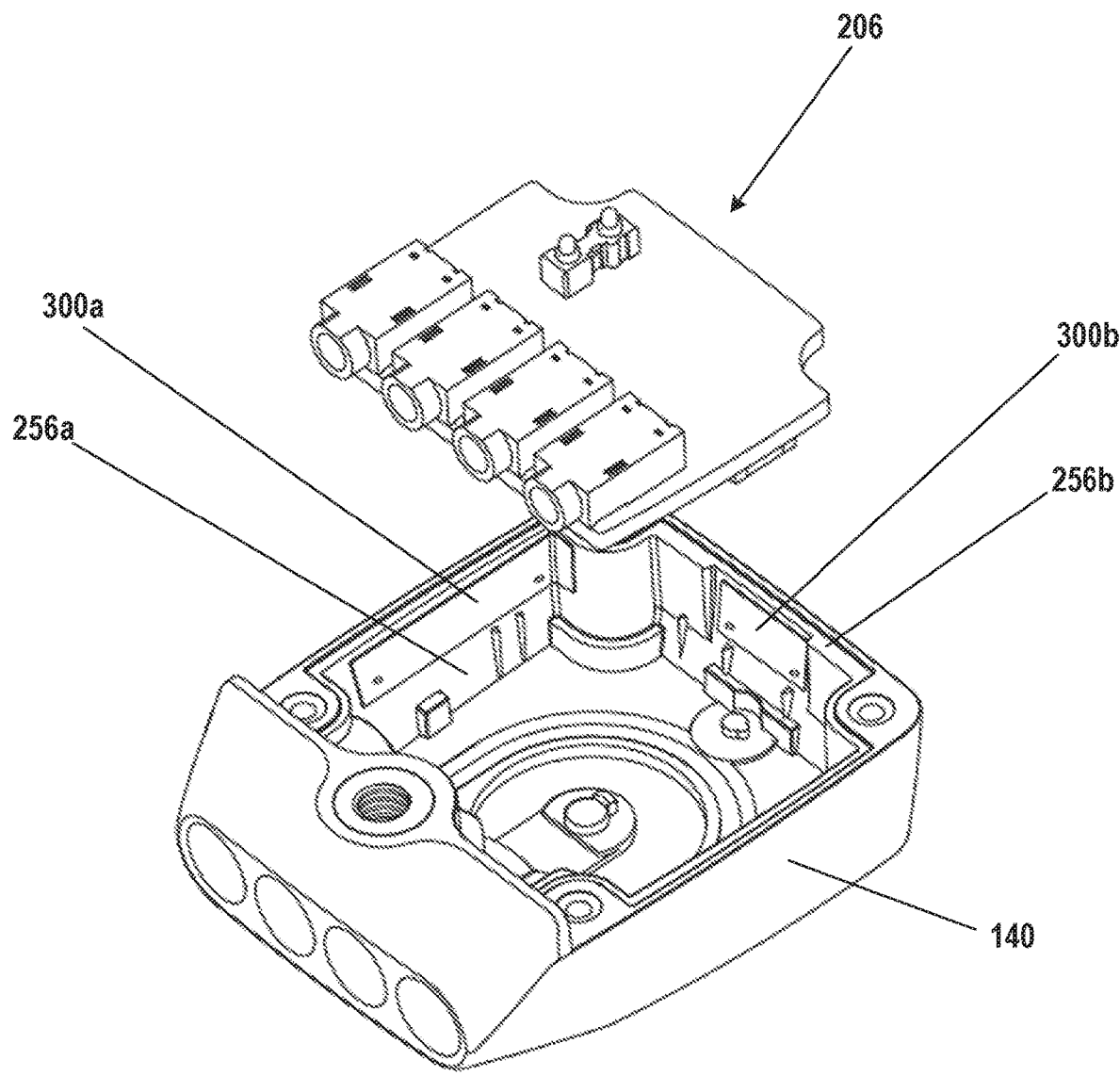
FIG. 23 is a partial exploded perspective view of an example of an electrical control device.
Figure 24:
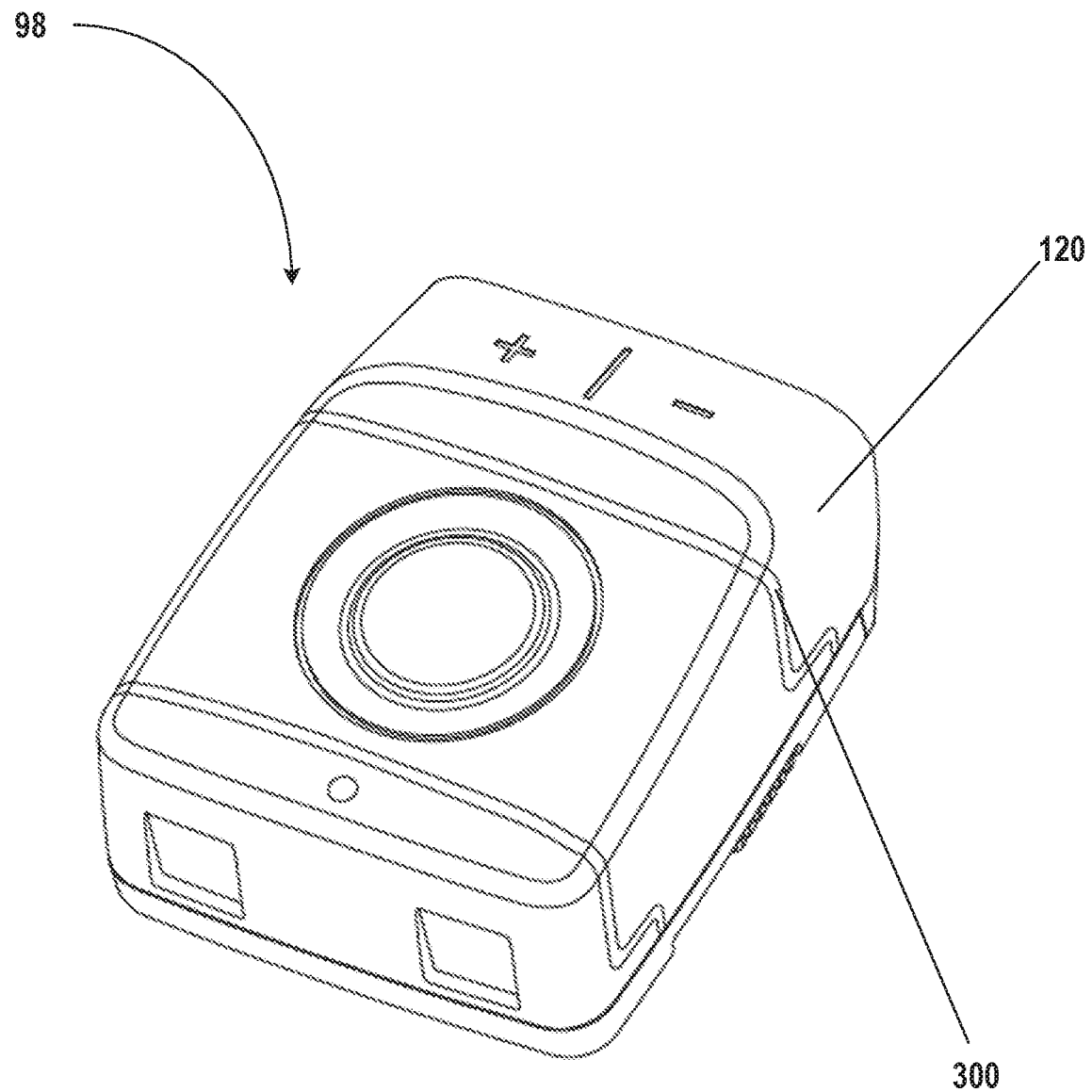
FIG. 24 is a perspective view of an example of an electrical control device.

With reference to FIGS. 23 and 24, in one embodiment, a layer of electrically conductive material 300 is physically connected to at least one of the inner surfaces 256 of the protective housing 120, respectively. The layer of electrically conductive material 300 is physically connected to the at least one inner surface 256 of the protective housing 120 in any number of ways including, for example, with an adhesive or a weld. For example, as shown in the example of FIG. 23, a first layer of electrically conductive material 300a is physically connected to the first inner surface 256a, a second layer of electrically conductive material 300b is physically connected to the second inner surface 256b, and a third layer of electrically conductive material 300 is physically connected to the third inner surface 256 (not shown). Additional, fewer, and/or different layers of electrically conductive materials (e.g., on different inner surfaces of the protective housing 120) may be provided. The electrically conductive materials may be any number of shapes, sizes, and/or may be made of any number of different materials. For example, the first layer of electrically conductive material 300a, the second layer of electrically conductive material 300b, and/or the third layer of electrically conductive material may be generally rectangular in shape and may be made of aluminum.

At least one of the antennas 232 is electrically connected to one or more of the layers of electrically conductive material 300 (e.g., the first layer 300a, the second layer 300b, and the third layer). In one example, one of the antennas 232 (e.g., the first antenna 232a) is electrically connected to all of the layers of electrically conductive material 300. In another example, the first antenna 232a is electrically connected to one or more of the layers of electrically conductive material 300, and the second antenna 232b is electrically connected to one or more of the layers of electrically conductive material 300. One or more of the antennas 232 may be electrically connected to one or more of the layers of electrically conductive material 300 in any number of ways including, for example, with wire or an electrically conductive contact (e.g., a thin layer of material).

The layers of electrically conductive material 300 increase the surface area for one or more of the antennas 232 and may increase the theoretical maximum efficiency for the respective antenna 232. With reference to FIG. 24, in one embodiment, the layer of electrically conductive material 300 forms part of the protective housing 120 and is visible from outside the control device 98.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An electrical control device for a bicycle, the electrical control device comprising:
    a housing;
    an assembly supported within the housing, the assembly including a printed circuit board ("PCB"), the PCB including a substrate and circuitry embedded within, attached to, or embedded within and attached to the substrate, the substrate including a first side and a second side;
    a communication device including an antenna, the communication device and antenna electrically connected to the circuitry and supported on the second side of the substrate;
    a plurality of connectors, the plurality of connectors located on the first side of the substrate; and
    a power source supported within the housing, the power source being electrically connected to the circuitry,
    wherein the substrate is disposed between the power source and the antenna, and
    wherein the power source is disposed at a distance from the PCB.

2. The electrical control device of claim 1, wherein the communication device includes two antennas,
    wherein the power source is in electrical communication with the first side of the substrate,
    wherein a first antenna of the two antennas is supported by the second side of the substrate at a first position, and a second antenna of the two antennas is supported by the second side of the substrate at a second position, the first position and the second position being adjacent to a perimeter of the second side of the substrate, respectively, and being at a distance from each other, and
    wherein the power source is configured to provide power to the first antenna and the second antenna.

3. The electrical control device of claim 2, wherein the perimeter of the second side has at least a first edge and a second edge opposite and at a distance from the first edge, the first antenna being adjacent to the first edge and the second antenna being adjacent to the second edge.

4. The electrical control device of claim 1, wherein the power source includes a removable battery.

5. The electrical control device of claim 4, further comprising a battery cover separate from the housing that is removably connectable to a portion of the housing, the removable battery being disposable between the battery cover and the portion of the housing, within a recess at least partially defined by the portion of the housing.

6. The electrical control device of claim 5, further comprising a rigid support that extends away from the portion of the housing, and
    wherein the substrate abuts the rigid support.

7. The electrical control device of claim 6, wherein the plurality of connectors includes four connectors supported by the first side the substrate, the plurality of connectors abutting or being adjacent to the rigid support.

8. The electrical control device of claim 1, wherein the plurality of connectors being in line with each other,
    the plurality of connectors are disposed between the substrate and the power source, the connectors being ports configured for attachment to component connectors for communication of data with other components of the bicycle.

9. The electrical control device of claim 1, wherein the housing includes a blind hole extending from an outer surface of the housing, into the housing,
    wherein the electrical control device further comprises a threaded insert positioned within the blind hole, the threaded insert having a through hole extending between a first side of the threaded insert and a second side of the threaded insert, a size of the through hole being larger at the first side of the threaded insert compared to the second side of the threaded insert, and
    wherein less than all of the through hole is threaded.

10. The electrical control device of claim 1, wherein the housing includes a bicycle attachment device configured for attachment to the bicycle.

11. An electrical control device for a bicycle, the electrical control device comprising:
    a housing;
    a printed circuit board ("PCB") substrate supported within the housing, wherein the PCB substrate includes a first side and a second side;

at least two antennas electrically connected to and supported on the second side of the substrate, a first antenna of the at least two antennas being supported on the second side of the substrate at a first position on the substrate and a second antenna of the at least two antennas being supported on the second side of the substrate at a second position on the substrate, the second position being different than the first position;

a plurality of connectors, the plurality of connectors located on the first side of the substrate; and a power source, wherein the power source is disposed at a distance from the PCB.

12. The electrical control device of claim 11, wherein the substrate is a unitary substrate.

13. The electrical control device of claim 11, wherein the housing includes a bicycle attachment device configured for attachment to the bicycle.

14. The electrical control device of claim 11, wherein the first antenna is configured to communicate with one or more components of the bicycle operable to change a physical state of the bicycle.

15. The electrical control device of claim 14, wherein the first antenna has a higher efficiency than the second antenna.

16. The electrical control device of claim 11, wherein the first position is adjacent to a first edge partially defining a perimeter of the second side of the substrate, and the second position is adjacent to a second edge partially defining the perimeter of the second side of the substrate.

17. The electrical control device of claim 11, further comprising a power source supported within the housing, at a distance from the substrate,
    wherein the at least two antennas and the power source are electrically connected to opposite sides of the substrate, respectively.

18. The electrical control device of claim 11, wherein the housing has an inner surface,
    wherein the electrical control device further comprises a layer of electrically conductive material, the layer of electrically conductive material being physically connected to the inner surface of the housing, and
    wherein at least one antenna of the at least two antennas is electrically connected to the layer of electrically conductive material.

19. The electrical control device of claim 1, further comprising battery spring contacts located on the first side of the substrate.

20. The electrical control device of claim 1, further comprising a processing unit, wireless chip, and LED located on the second side of the substrate.

* * * * *